(12) United States Patent  
Davis et al.

(10) Patent No.: US 8,656,789 B2
(45) Date of Patent: *Feb. 25, 2014

(54) ADAPTER ASSEMBLY FOR A UTILITY METER FOR WIRELESSLY TRANSMITTING DATA

(75) Inventors: Michael B. Davis, Backus, MN (US); Nathan Edward Woody, Cumming, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 457 days.

This patent is subject to a terminal disclaimer.

(21) Appl. No.: 13/042,913

(22) Filed: Mar. 8, 2011

(65) Prior Publication Data

US 2012/0227511 A1 Sep. 13, 2012

(51) Int. Cl.
*G01F 1/11* (2006.01)
*G01B 7/30* (2006.01)

(52) U.S. Cl.
USPC ............... 73/861.88; 73/861.93; 324/207.25

(58) Field of Classification Search
None
See application file for complete search history.

(56) References Cited

U.S. PATENT DOCUMENTS

| | | | |
|---|---|---|---|
| 4,600,923 A | 7/1986 | Hicks et al. | |
| D310,973 S | 10/1990 | Edwards et al. | |
| 5,690,049 A | 11/1997 | Marshall et al. | |
| 6,100,816 A | 8/2000 | Moore | |
| 7,113,063 B2 | 9/2006 | Romanik et al. | |
| 7,400,265 B2 | 7/2008 | Gebler et al. | |
| 8,336,407 B2 | 12/2012 | Abdul-Hadi et al. | |
| 8,451,001 B2 * | 5/2013 | Abdul-Hadi et al. | .... 324/207.25 |
| 2002/0059895 A1 | 5/2002 | Adams et al. | |
| 2005/0046417 A1 | 3/2005 | Hwang et al. | |
| 2009/0038535 A1 | 2/2009 | Morales et al. | |
| 2009/0153357 A1 | 6/2009 | Bushman et al. | |
| 2009/0212767 A1 | 8/2009 | Di Marco et al. | |
| 2012/0227518 A1 | 9/2012 | Abdul-Hadi et al. | |
| 2013/0036834 A1 | 2/2013 | Abdul-Hadi et al. | |

OTHER PUBLICATIONS

U.S. Appl. No. 13/042,764, "Office Action", Sep. 5, 2012, 6 pages.
"U.S. Appl. No. 13,205,903; Office Action," Jan. 11, 2013, 13 pages.
"U.S. Appl. No. 13/042,764; Notice of Allowance," Oct. 12, 2012, 8 pages.
U.S. Appl. No. 13/205,903; "Notice of Allowance," Mar. 26, 2013, 6 pages.

* cited by examiner

*Primary Examiner* — Harshad R Patel
(74) *Attorney, Agent, or Firm* — Kilpatrick Townsend & Stockton LLP

(57) ABSTRACT

An adapter assembly that works with a standard utility meter to wirelessly transmit data about consumption. The adapter assembly generates information about consumption by cooperating with a pointer of an index of a utility meter. In some embodiments, the adapter assembly includes an upper portion and a clip that interface together. The upper portion and the clip are configured to maintain alignment with the pointer and not create stress on the index.

20 Claims, 54 Drawing Sheets

ADAPTER ASSEMBLY FOR A UTILITY METER FOR WIRELESSLY TRANSMITTING DATA

RELATED APPLICATION

This application is related to U.S. Ser. No. 13/042,764, which is filed concurrently herewith, is titled "Utility Meter Adapter," and names Louay Ibrahim Abdul-Hadi and Nathan Edward Woody as inventors, the contents of which are hereby incorporated by reference.

RELATED FIELDS

Utility meter adapters, and more particularly, improved adapters for retrofitting an analog utility meter to support remote data collection.

BACKGROUND

The usage of utility products such as gas and electricity and water are typically measured using meters. In the context of gas, a gas meter is used to measure the volume of gas moving through the meter. At least one diaphragm is located inside the typical gas meter that expands and contracts as gas moves through the meter. The movement of the diaphragm causes a rotation of a series of gears inside the meter, which in turn engages a gear located on the back of the face (also referred to herein as the index) of the meter. The gear on the back of the index of the meter turns a pointer that acts as a counter mechanism and that is visible on the face of the meter. Other types of utility meters also include similar types of gears and indexes. Typically, a utility company employee physically inspects each customer's meter and notes the positioning of the counter with respect to the dials on the face of the meter.

The process of determining meter consumption has become more automated in recent years. Automated meters that automatically capture consumption data and transmit this data wirelessly are used in some contexts. In lieu of replacing all existing meters with new automated meters, adapters are used that retrofit existing meters so they are capable of providing remote data collection capability.

SUMMARY

Disclosed are adapter assemblies that work with analog utility meters, such as, but not limited to, Sprague or National brand utility meters, to transmit data about consumption. The adapter assembly cooperates with a pointer of an index of a utility meter to generate magnet pulses as the pointer rotates. In some embodiments, the adapter assembly includes an upper portion and a clip that mate together. The upper portion and the clip are configured to interact with each other to maintain alignment with the pointer and reduce stress on the index.

Applicants do not wish to be bound by the forgoing or any other understanding of how their invention or any of the prior art works.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different figures is intended to illustrate like or analogous components.

DETAILED DESCRIPTION

FIGS. 1-27 illustrate different views of various components of an adapter assembly 10 according to one embodiment. An adapter assembly 10 according to this embodiment comprises an upper portion 12 (FIGS. 1-9) and a clip 14 (FIGS. 10-17) that mate together (see FIGS. 18-28).

Figure 9:
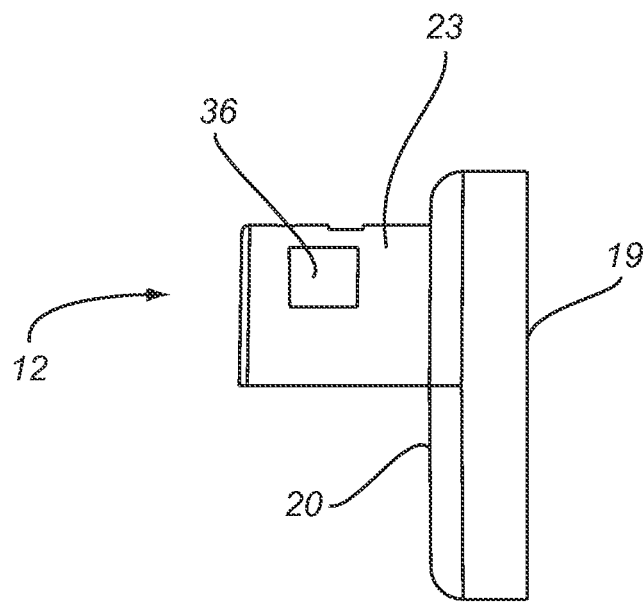
FIG. 9 is a side plan view of the upper portion shown in FIG. 1.
Figure 10:
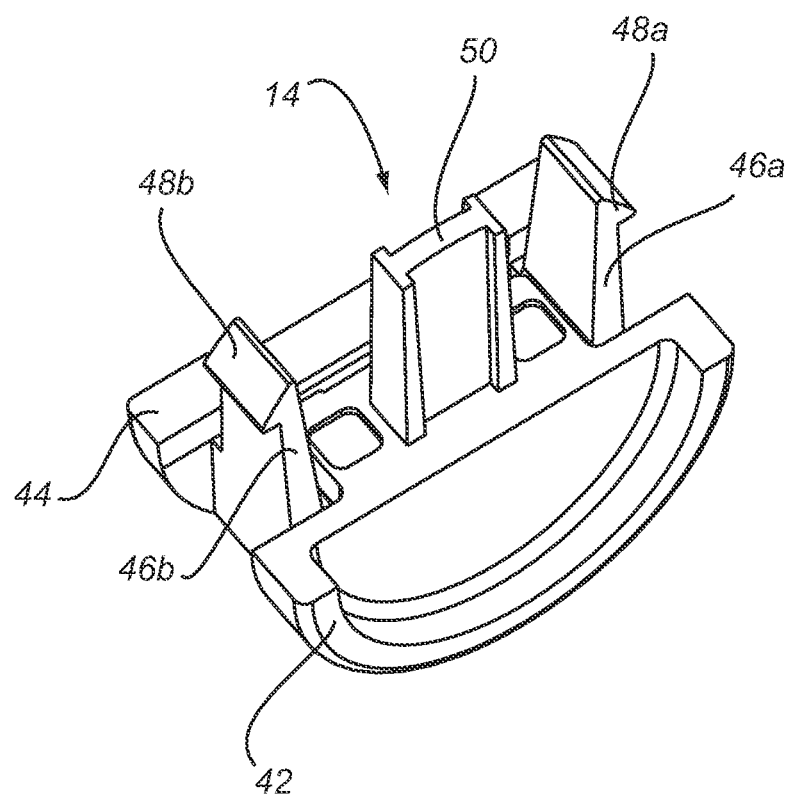
FIG. 10 is a top back perspective view of a clip of an adapter assembly according to one embodiment of the invention.
Figure 11:
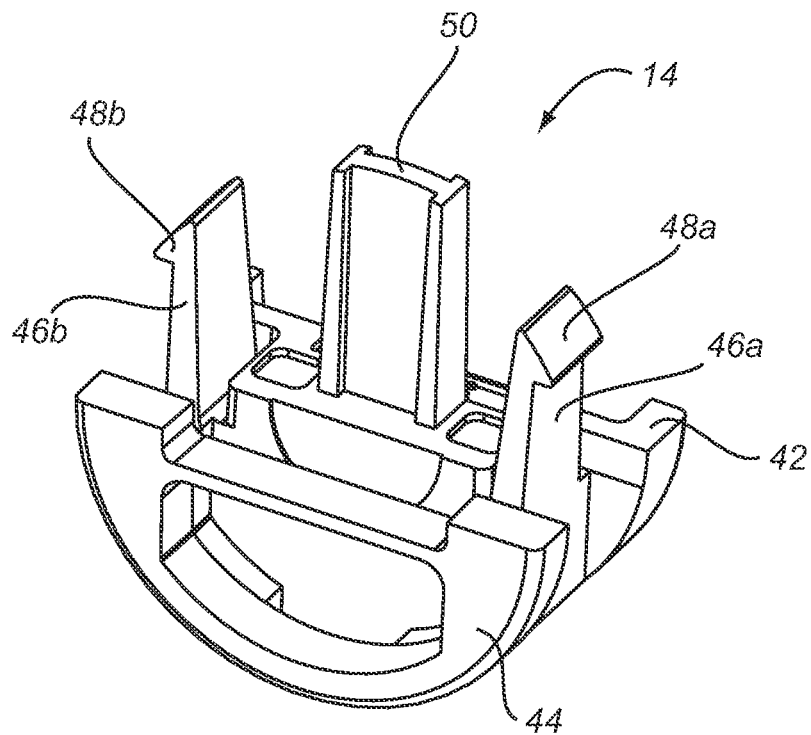
FIG. 11 is a front perspective view of the clip of FIG. 10.
Figure 12:
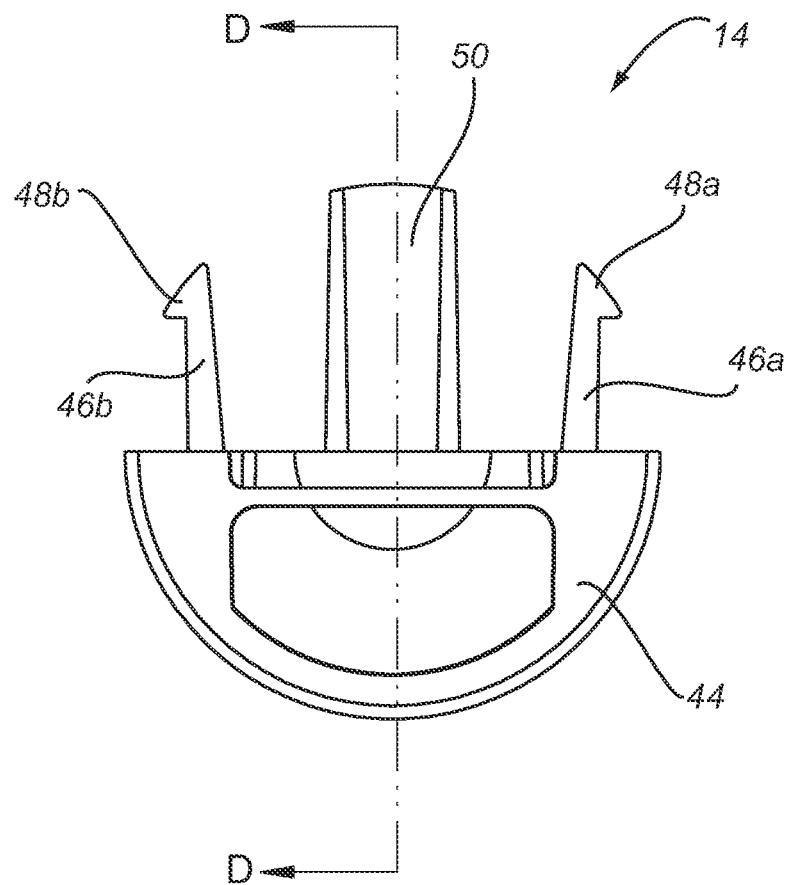
FIG. 12 is a front plan view of the clip of FIG. 10.
Figure 13:
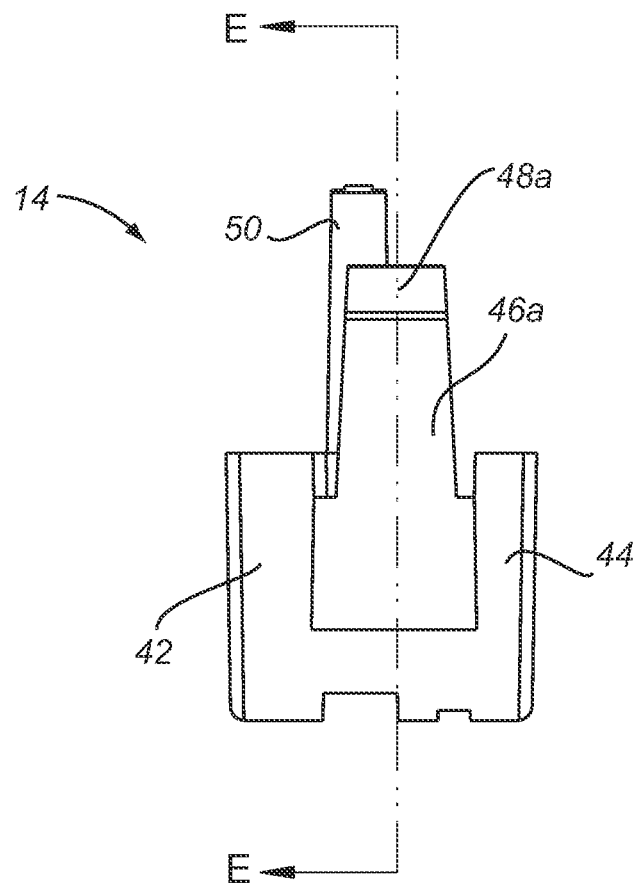
FIG. 13 is a side plan view of the clip of FIG. 10.
Figure 14:
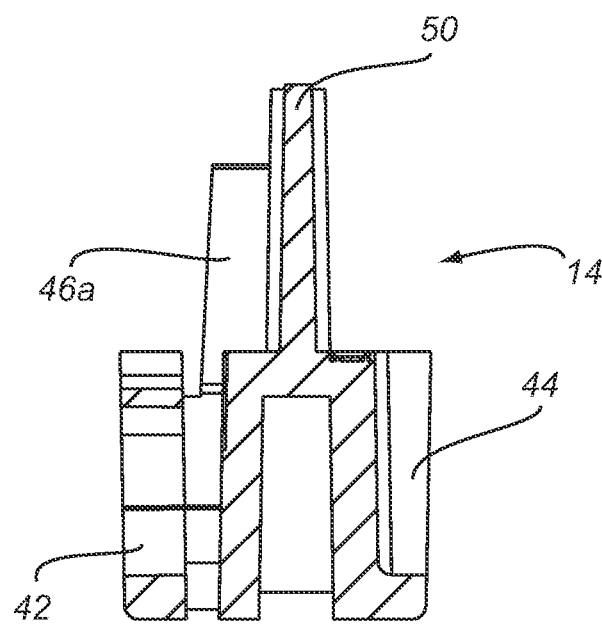
FIG. 14 is a cross-sectional view of the clip of FIG. 10, taken along line D-D of FIG. 12.
Figure 15:
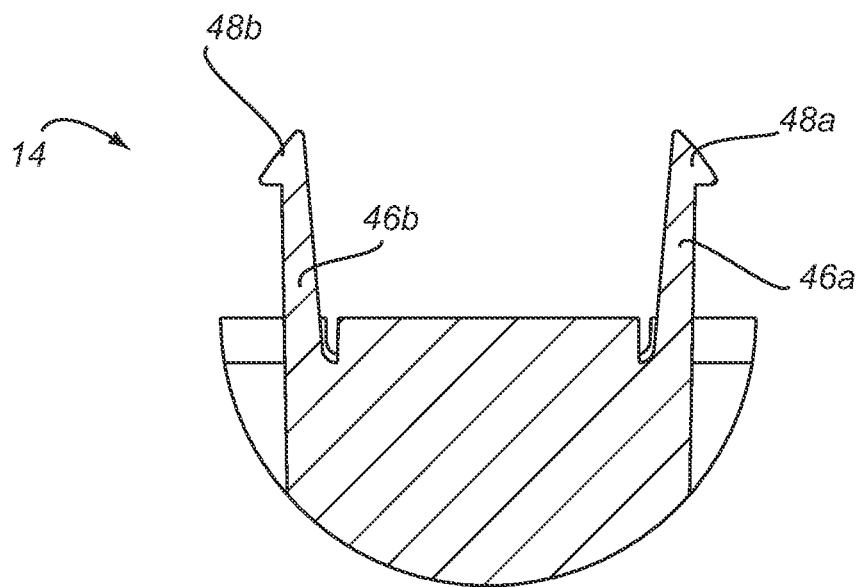
FIG. 15 is a cross-sectional view of the clip of FIG. 10, taken along line E-E of FIG. 13.
Figure 16:
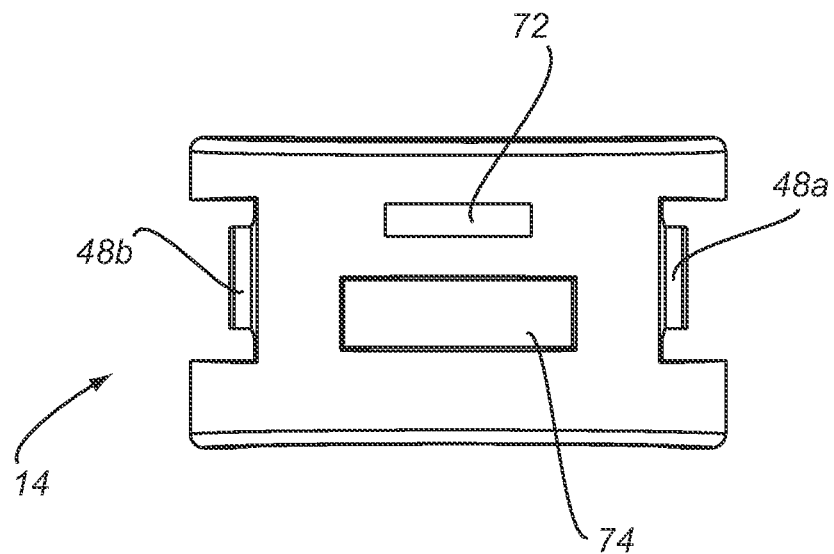
FIG. 16 is a bottom plan view of the clip of FIG. 10.

In some embodiments, upper portion 12 of adapter assembly 10 is circular, although upper portion 12 can be any suitable shape. Upper portion 12 includes a front surface 18 and a back surface 20 (FIG. 9). In some embodiments, a lip 19 extends from front surface 18 around the periphery of the front surface of upper portion 12. One or more cavities 22 are formed on front surface 18 of upper portion 12, the one or more cavities being shaped and sized to receive one or more magnets 16. In the embodiment shown, front surface 18 includes two cavities 22. The cavities 22 include a plurality of ribs 21 that help contain magnet 16 within cavity 22 once magnet 16 is pressed into cavity 22. In some embodiments, the cavities are of similar shape and size, although alternative configurations can be used.

Figure 1:
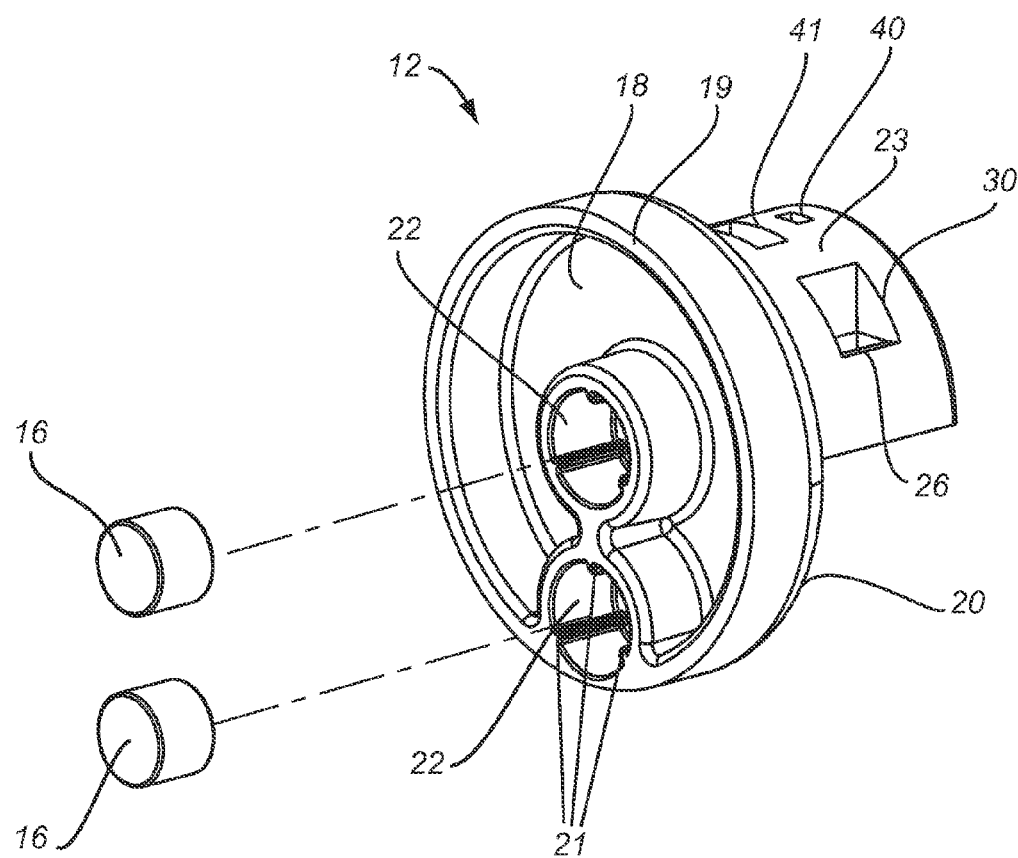
FIG. 1 is a perspective front view of an upper portion of an adapter assembly according to one embodiment.
Figure 2:
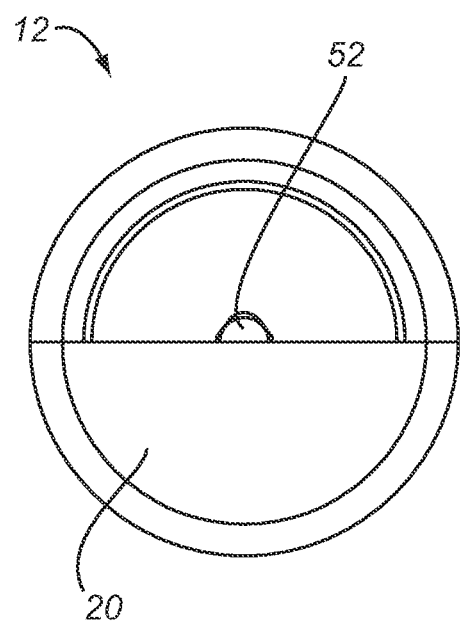
FIG. 2 is a back plan view of the upper portion shown in FIG. 1.
Figure 3:
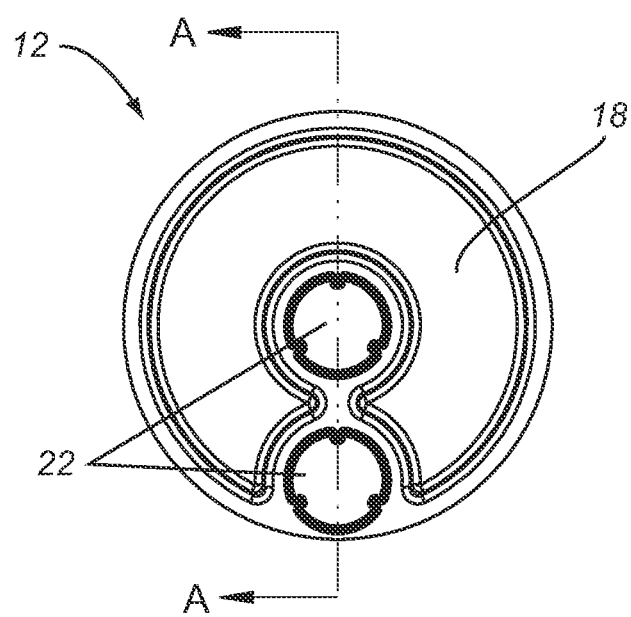
FIG. 3 is a front plan view of the upper portion shown in FIG. 1.
Figure 4:
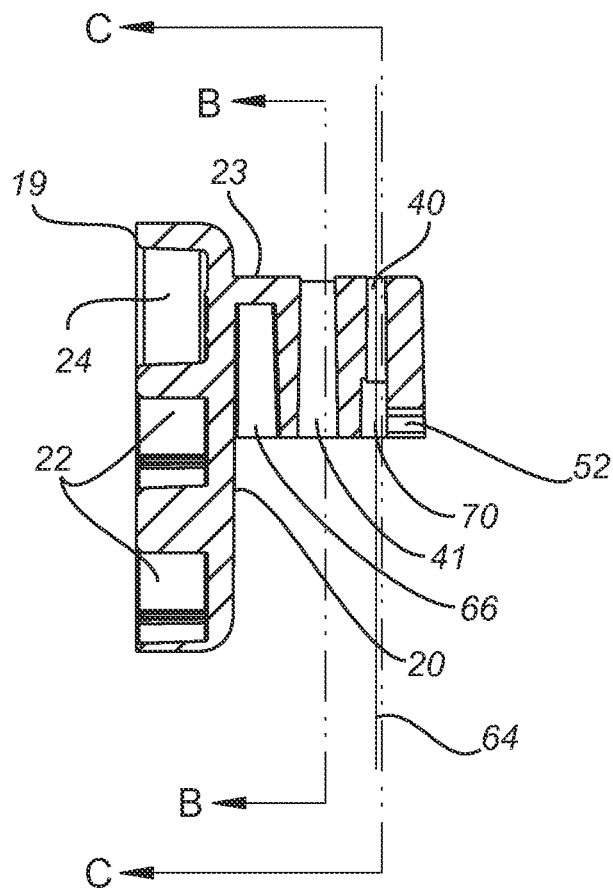
FIG. 4 is a cross-sectional view of the upper portion shown in FIG. 1, taken along line A-A of FIG. 3.
Figure 6:
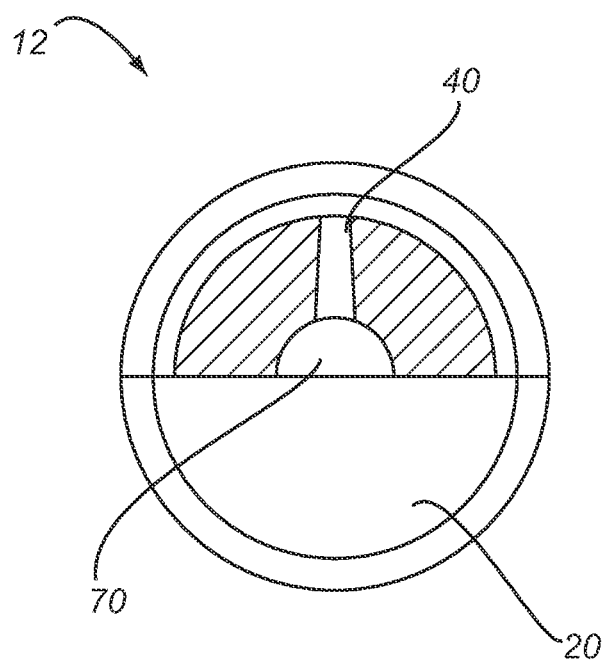
FIG. 6 is a cross-sectional view of the upper portion shown in FIG. 1, taken along line C-C of FIG. 4.
Figure 7:
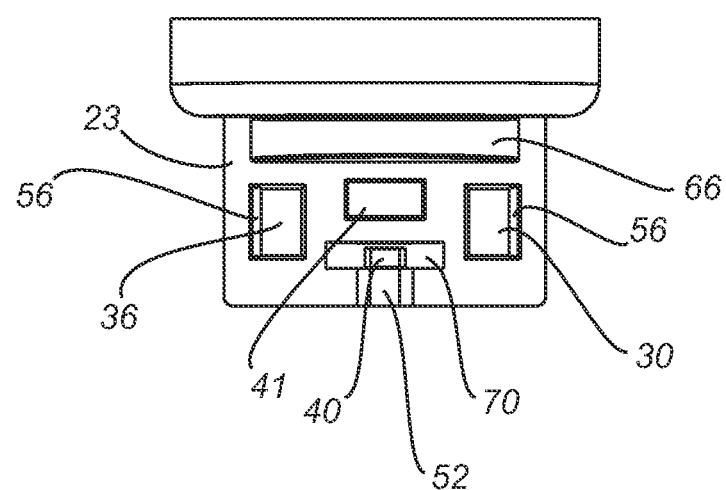
FIG. 7 is a bottom plan view of the upper portion shown in FIG. 1.
Figure 8:
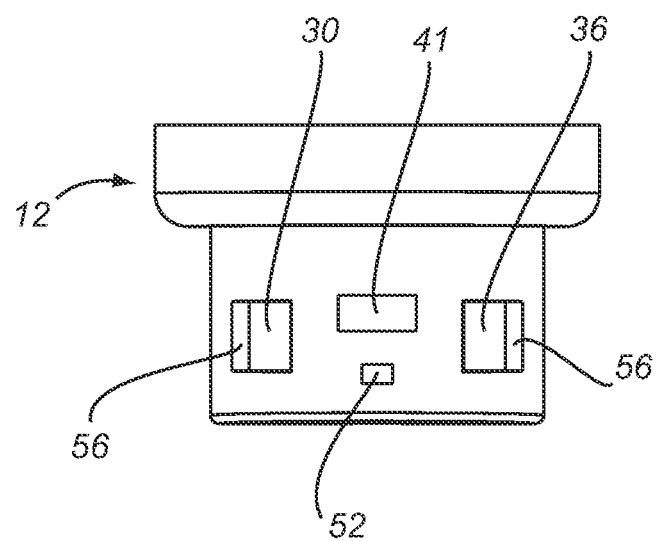
FIG. 8 is a top plan view of the upper portion shown in FIG. 1.

As shown in FIGS. 6 and 9, a base 23 extends from back surface 20 of upper portion 12. As shown in FIG. 7, base 23 includes a first gap 36, a second gap 30, and a third gap 41. Base 23 also includes an opening 70 and an aperture 40, as shown in FIGS. 4 and 6-7. Aperture 40 lies along the same axis 64 as opening 70, as shown in FIG. 4. Aperture 40 is shaped and sized to receive tip 6 of pointer 4 of the gas meter index 2 illustrated in FIGS. 18-22. Opening 70 is shaped and sized to receive the body 8 of pointer 4.

Figure 5:
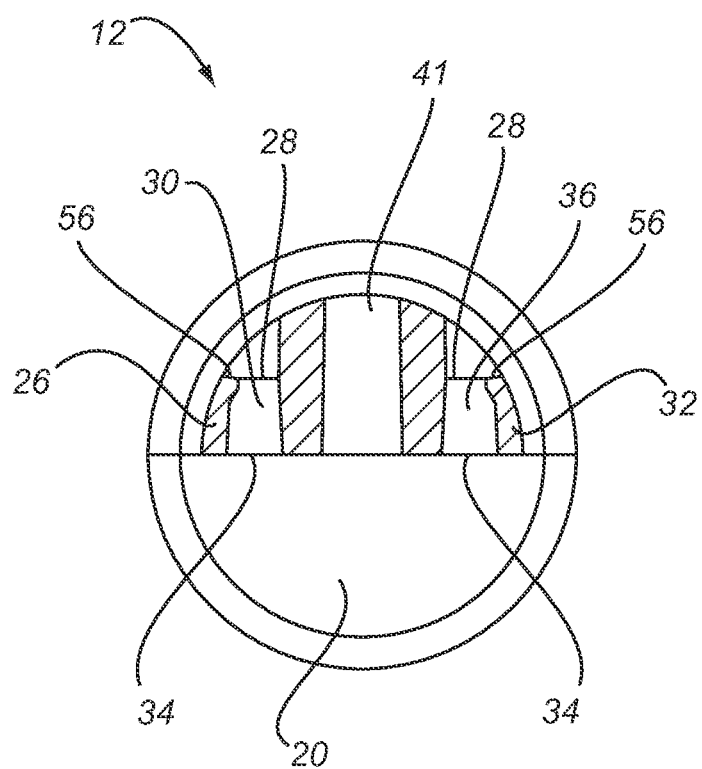
FIG. 5 is a cross-sectional view of the upper portion shown in FIG. 1, taken along line B-B of FIG. 4.

As shown in FIG. 5, at the cross-section taken at line B-B, left abutment 26 abuts first gap 30 along a portion of first gap 30. At this same cross-section, right abutment 32 abuts second gap 36 along a portion of second gap 36. The configuration of left and right abutments 26 and 32 reduces the size of the gaps 30 and 36, as illustrated in FIG. 5, at one end 28 of the gaps 30 and 36. Specifically, the gaps 30 and 36 are narrower in width at end 28 than at end 34. As shown in FIG. 5, left and right abutments 26, 32 each include a surface 56. Base 23 may optionally include a recess 66 (FIGS. 4 and 7) that helps maintain a generally consistent wall thickness for molding considerations, and a cavity 52 (FIGS. 2 and 4) that is shaped and sized to receive stem 9 of pointer 4, as explained below and shown in FIG. 24. As shown in FIG. 4, cavity 52 is positioned with respect to opening 70 so that the body 8 of pointer 4 is received within opening 70 and the stem 9 of pointer 4 is received within cavity 52.

Figure 24:
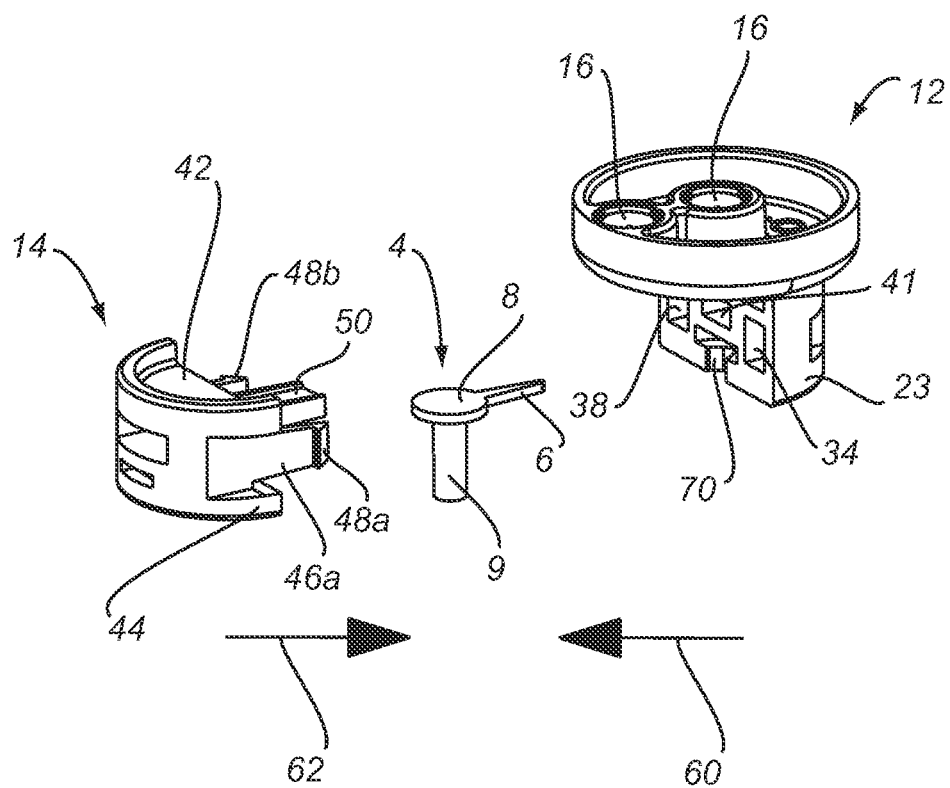
FIG. 24 is an exploded perspective view of the upper portion of FIG. 1 and the clip of FIG. 10 positioned with respect to a pointer of an index, such as the index illustrated in FIG. 18.
Figure 25:
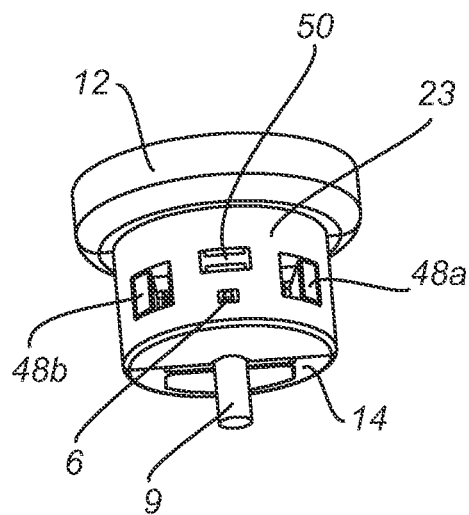
FIG. 25 is a back top perspective view of the adapter assembly of FIG. 18 fitted with a pointer of the index of FIG. 18.
Figure 26:
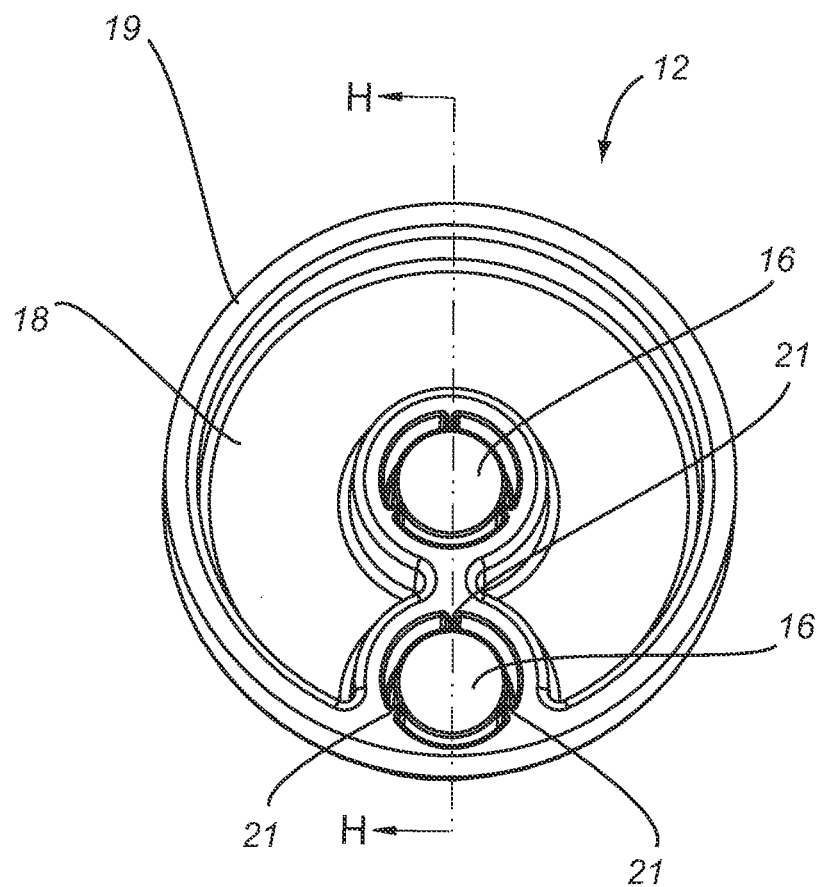
FIG. 26 is a front view of the adapter assembly of FIG. 19.
Figure 27:
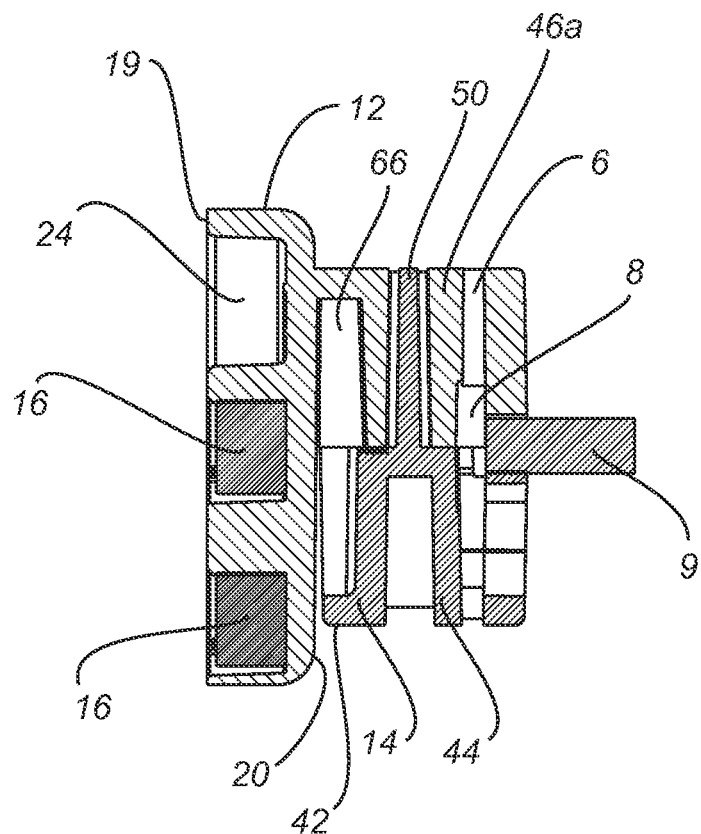
FIG. 27 is a cross-sectional view of the adapter assembly of FIG. 26 fitted with a pointer of the index of FIG. 18, taken along line H-H of FIG. 26.
Figure 28:
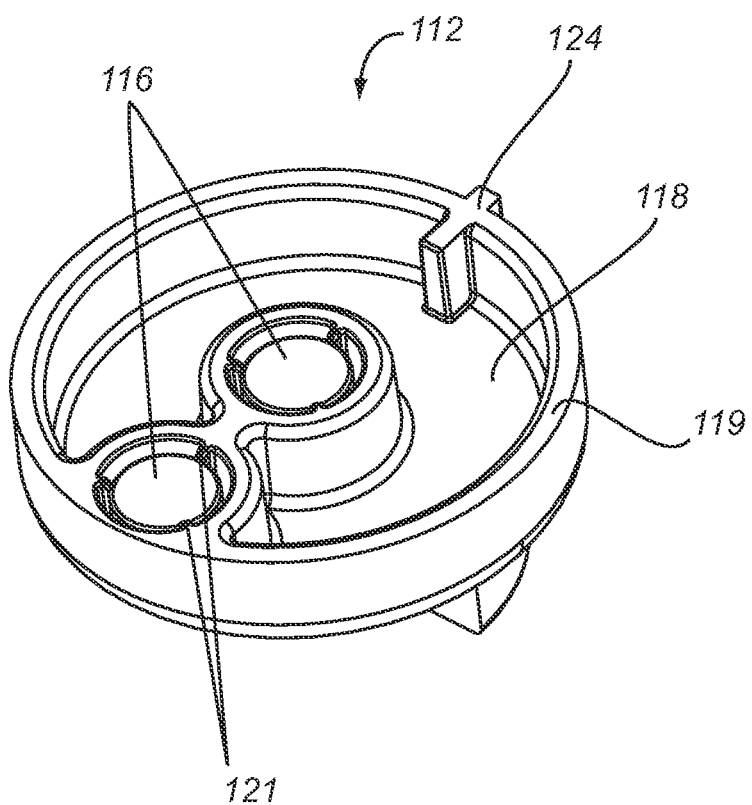
FIG. 28 is a perspective front view of an upper portion of an adapter assembly according to another embodiment.

The upper portion 12 fits together with a clip 14 to form adapter assembly 10 for use with index 2. As shown in FIGS. 24 and 27, for example, the back surface 20 of upper portion 12 is positioned with respect to the back surface 42 of clip 14 as the upper portion 12 and clip 14 fit together. FIGS. 10-17 show various views of clip 14. As shown in FIGS. 10-13, clip 14 includes two arms 46a, 46b, which extend from the clip 14 and which each include an extension 48a, 48b that extends laterally from the respective arm 46a, 46b. Turning to FIGS. 25-27, arms 46 of clip 14 are configured to be received within the first gap 30 and the second gap 36, respectively, of the base 23 of upper portion 12 when clip 14 mates with upper portion 12. Due to the configuration of abutments 26, 32, there is little to no interference between the arms 46 of clip 14 and abutments 26, 32 as the arms first enter openings 30 and 36 at end 34.

As mentioned above, the configuration of abutments 26, 32 reduces the size of the openings 30 and 36 at each opening's respective end 28. In this way, end 28 of openings 30 and 36 is narrower in width than end 34 of openings 30 and 36. In the embodiment shown, the width of end 28 of openings 30, 36 is narrower than the width of extensions 48a, 48b so that abutments 26, 32 place stress on the extensions 48a, 48b of the clip 14 as they extend through end 28 of openings 30 and 36, such stress compressing the arms 46 of the clip 14 so that extensions 48a, 48b are capable of fitting through end 28. Once the extensions 48a, 48b are through the end 28 of openings 30, 36 (see FIG. 23), abutments 26, 32 no longer place stress on arms 46 and the arms 46 spring back out. Once the extensions 48a, 48b are through the end 28 of openings 30 and 36, extensions 48a, 48b abut surfaces 56 of left and right abutments 26, 32 to help keep arms 46a, 46b in place and to maintain a space between the upper portion 12 and the clip 14 to accommodate the stem 9 of pointer 4. There are numerous other ways of accomplishing the spring-fit feature of clip 14 with upper portion 12.

Figure 17:
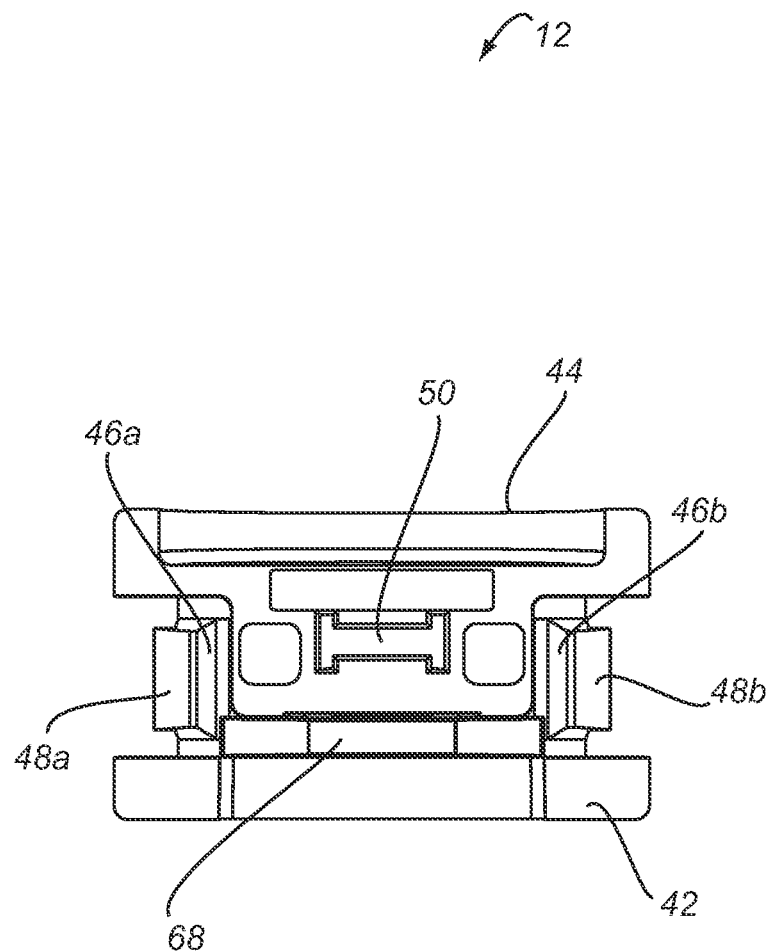
FIG. 17 is a top plan view of the clip of FIG. 10.

Clip 14 also includes a cavity 68 between a front surface 44 of the clip and the back surface 42 of clip 14 (FIG. 17). Cavity 68 is shaped and sized to accommodate the body 8 of pointer 4 of index 2. Clip 14 includes a tongue 50 that fits in third gap 41 of upper portion 12 when upper portion 12 and clip 14 are fitted together. In some embodiments, clip 14 optionally includes apertures 72 and 74 (FIG. 16) that assist with the tooling and molding process. For instance, aperture 72 provides support in the mold and aperture 74 helps maintain a generally constant thickness.

Figure 18:
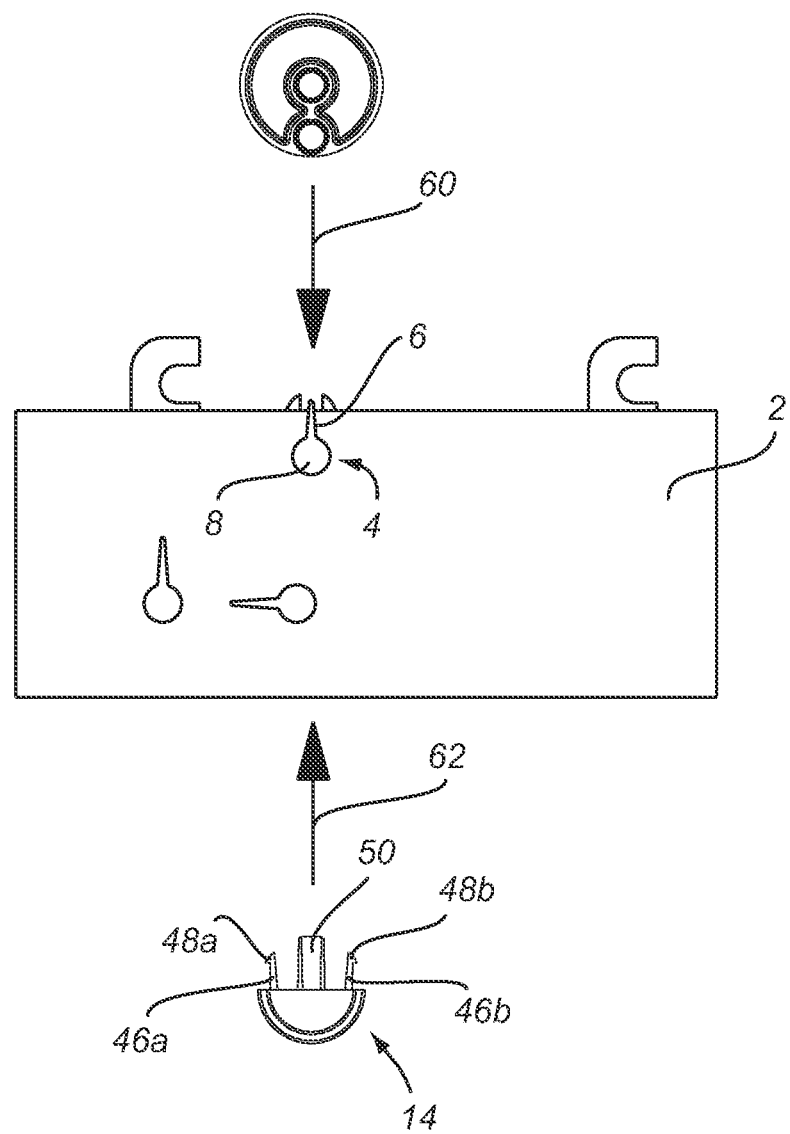
FIG. 18 is a front plan view of an index positioned with respect to the upper portion of FIG. 1 and the clip of FIG. 10, according to one embodiment.

In use, as shown in FIGS. 18 and 24, upper portion 12 and clip 14 mate together to engage pointer 4 of index 2. Specifically, upper portion 12 is positioned with respect to index 2 from a first direction 60 so that the tip 6 of pointer 4 slides through opening 70 and rests in aperture 40 of upper portion 12 and so that the body 8 of pointer 4 rests within opening 70. Aperture 40 is slightly larger than the tip 6 of pointer 4, while opening 70 is slightly larger than the body 8 of pointer 4, but sized so that both the tip 6 and the body 8 are received snuggly within aperture 40 and opening 70, respectively, to maintain the alignment of pointer 4 within the adapter assembly and prevent upper portion 12 and clip 14 from wobbling.

Figure 19:
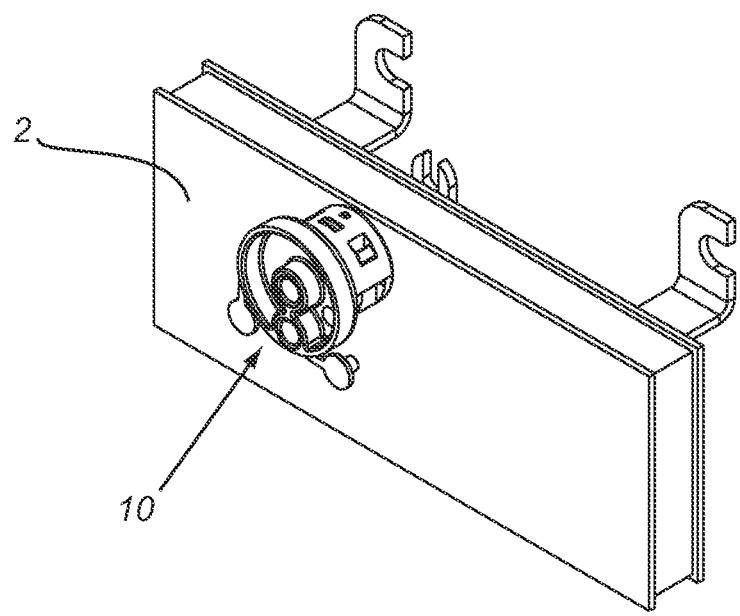
FIG. 19 is a front top perspective view of the index of FIG. 18 fitted with the adapter assembly of FIG. 18.
Figure 20:
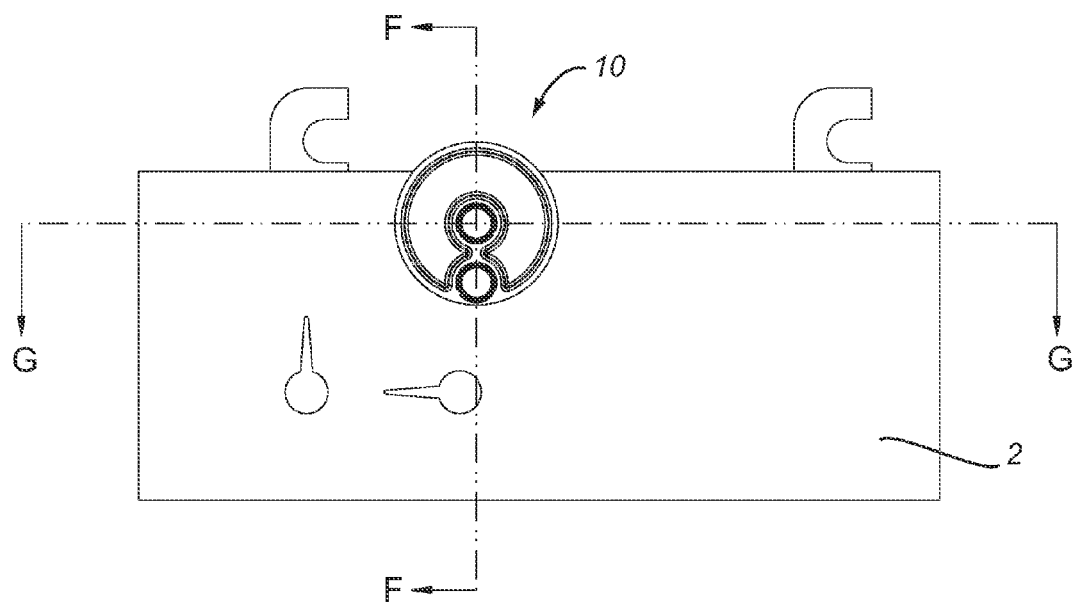
FIG. 20 is a front plan view of the index of FIG. 18 fitted with the adapter assembly of FIG. 18.
Figure 21:
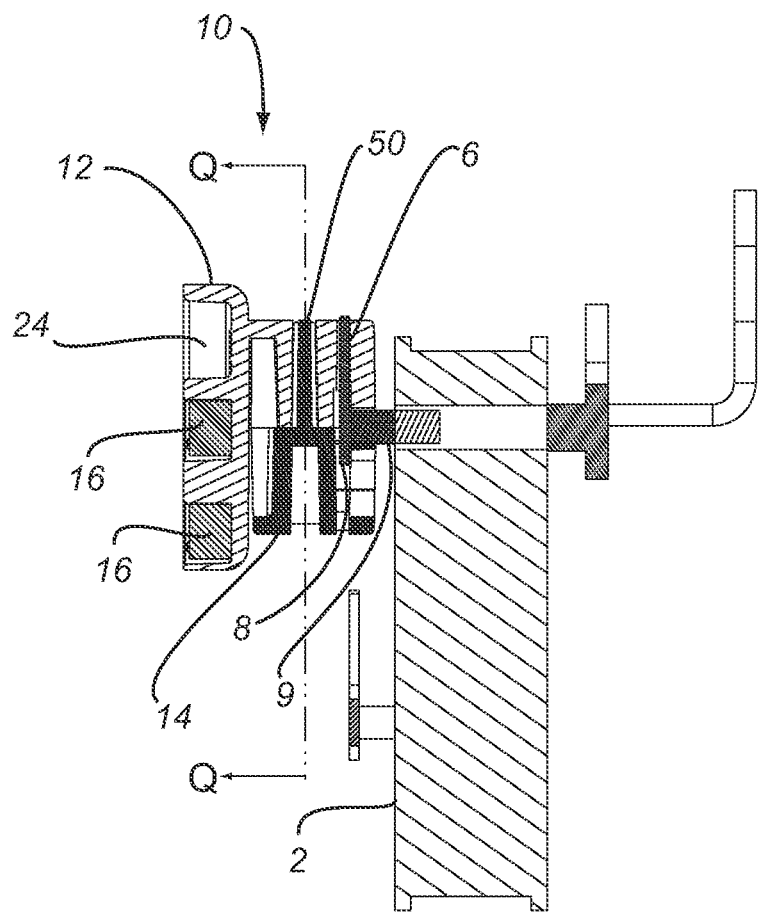
FIG. 21 is a cross-sectional view of the index of FIG. 18 fitted with the adapter assembly of FIG. 18, taken along line F-F of FIG. 20.
Figure 22:
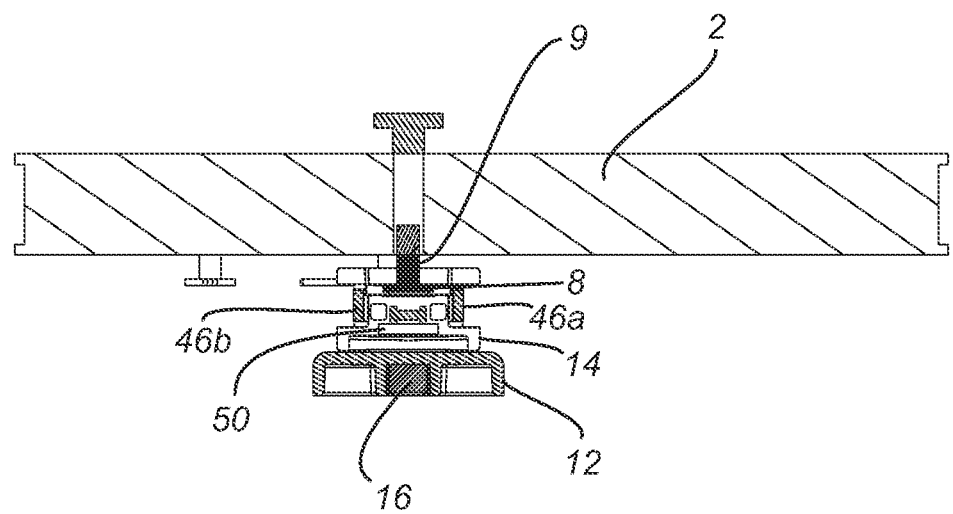
FIG. 22 is a cross-sectional view of the index of FIG. 18 fitted with the adapter assembly of FIG. 18, taken along line G-G of FIG. 20.
Figure 23:
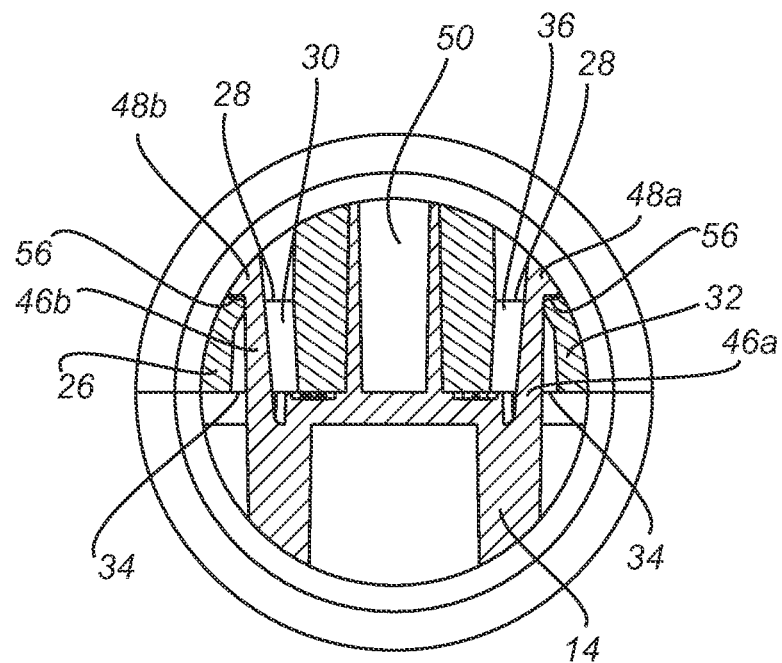
FIG. 23 is a cross-sectional view of the adapter assembly of FIG. 18, taken along line Q-Q of FIG. 21.

Next, clip 14 is positioned with respect to index 2 from a second direction 62, which is opposite first direction 60, so that clip 14 cooperates with pointer 4 and is mated onto upper portion 12 (FIGS. 18-19). Specifically, body 8 of pointer 4 abuts the cavity 68 of clip 14 when the clip is mated to the upper portion. Tongue 50 of clip 14 is received in third gap 41 of upper portion 12. Tongue 50 acts as a guiding pin and helps reduce any rocking of upper portion 12 and clip 14 when fitted together around pointer 4. As mentioned above, the positioning of arms 48a, 48b within gaps 30 and 36 is limited by abutments 26, 32 so that a gap is formed between upper portion 12 and clip 14 when the two components fit together. A stem 9 of pointer 4 (FIG. 24) is accommodated in this gap between the clip 14 and upper portion 12 when the two components are fitted together (FIG. 21). Clip 14 can be snap fit onto upper portion 12 to lock the upper portion 12 with respect to the pointer 4, or secured with respect to upper portion 12 in any suitable manner.

The rotation of the internal gears of the gas meter cause the pointer 4 to rotate, which can be used to track consumption as described above. Because the adapter assembly 10 is securely coupled to the pointer 4, the rotation of the pointer 4 causes the adapter assembly 10, and thus the magnets 16, to also rotate in a concentric motion. In some embodiments, one of the magnets 16 aligns with the axis of rotation of the pointer 4. The rotation of the magnet furthest from the center of upper portion 12 generates magnetic pulses that can be used to determine that the adapter assembly 10 is present on the index 2 and/or can be used to track the number of rotations of the pointer of the gas meter, and thus the consumption of gas as known to those of skill in the art. The magnet closer to the center of upper portion 12 can be used as a tamper detection feature so that it generates a signal if someone attempts to tamper with the adapter assembly 10. For example, if upper portion 12 and clip 14 are removed from pointer 4, the magnet closer to the center of upper portion 12 moves from its initial position and thus generates a signal corresponding to such movement. In some embodiments, a sensor board and radio assembly (not shown) are mounted adjacent the adapter assembly 10 and receive the pulses generated by the magnets, convert them into electronic form, and transmit them to a remote location. In some embodiments, the sensor board is located approximately 0.1-0.3 inches or any other suitable distance from the adapter assembly.

The configuration of upper portion 12 and clip 14 allows the two components to fit together around pointer 4 in a manner that allows the adapter assembly 10 to track to the pointer 4 without impacting the rotation of the pointer. Because adapter assembly 10 includes clip 14, clip 14 having a front surface 44 that is spaced apart from the back surface 42 of the clip, the back surface 20 of the upper portion 12 of adapter assembly does not contact the index in use. This reduces stress or friction on the index, which could shorten the life span of the index, as adapter assembly 10 rotates with pointer 4. Moreover, this configuration allows pointer 4 to rotate without obstruction.

In some embodiments, upper portion 12 and/or clip 14 are formed of polycarbonate, which is lightweight compared to the magnets 16, which are made of neodymium and iron in some embodiments. The lightweight nature of the adapter assembly 10 allows it to rotate freely with the pointer 4 and without exerting undue pressure on the pointer 4 (and in turn on the index). In other embodiments, adapter assembly 10 is made of other suitable materials. As shown in FIGS. 18-22, adapter assembly 10 is small enough that the majority of index 2 is still visible when adapter assembly 10 engages pointer 4.

FIGS. 28-54 illustrate different views of various components of an adapter assembly 110 according to another embodiment. Like adapter assembly 10, adapter assembly 110 comprises an upper portion 112 (FIGS. 28-36) and a clip 114 (FIGS. 37-44) that mate together (see FIGS. 45-52). Adapter assembly 110 is similar to adapter assembly 10 with some variations. For example, as shown in the Figures, the back 142 of clip 114 is different from back 42 of clip 14 to accommodate a different pointer 104 and index 102 assembly than pointer 4 and index 2. Moreover, as explained below, upper portion 112 comprises an indicator tab 124.

Figure 31:
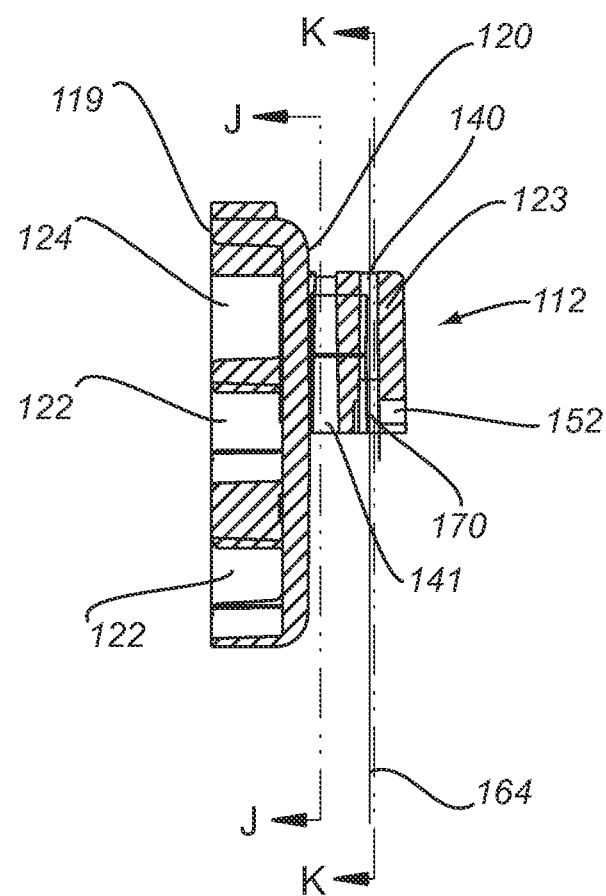
FIG. 31 is a cross-sectional view of the upper portion shown in FIG. 28, taken along line I-I of FIG. 30.

In some embodiments, upper portion 112 of adapter assembly 110 is circular, although upper portion 112 can be any suitable shape. Upper portion 112 includes a front surface 118 and a back surface 120 (FIG. 31). In some embodiments, a lip 119 extends from front surface 118 around the periphery of the front surface of upper portion 112. One or more cavities 122 also are formed in front surface 118 of upper portion 112, the cavities being shaped and sized to receive one or more magnets 116. In the embodiment shown, front surface 118 includes two cavities 122. The cavities 122 include a plurality of ribs 121 that help contain magnet 116 within cavity 122 once magnet 116 is pressed into cavity 122. In some embodiments, front surface 118 also includes an indicator tab 124, which is explained in more detail below. In some embodiments, the cavities are of similar shape and size, although alternative configurations can be used.

Figure 29:
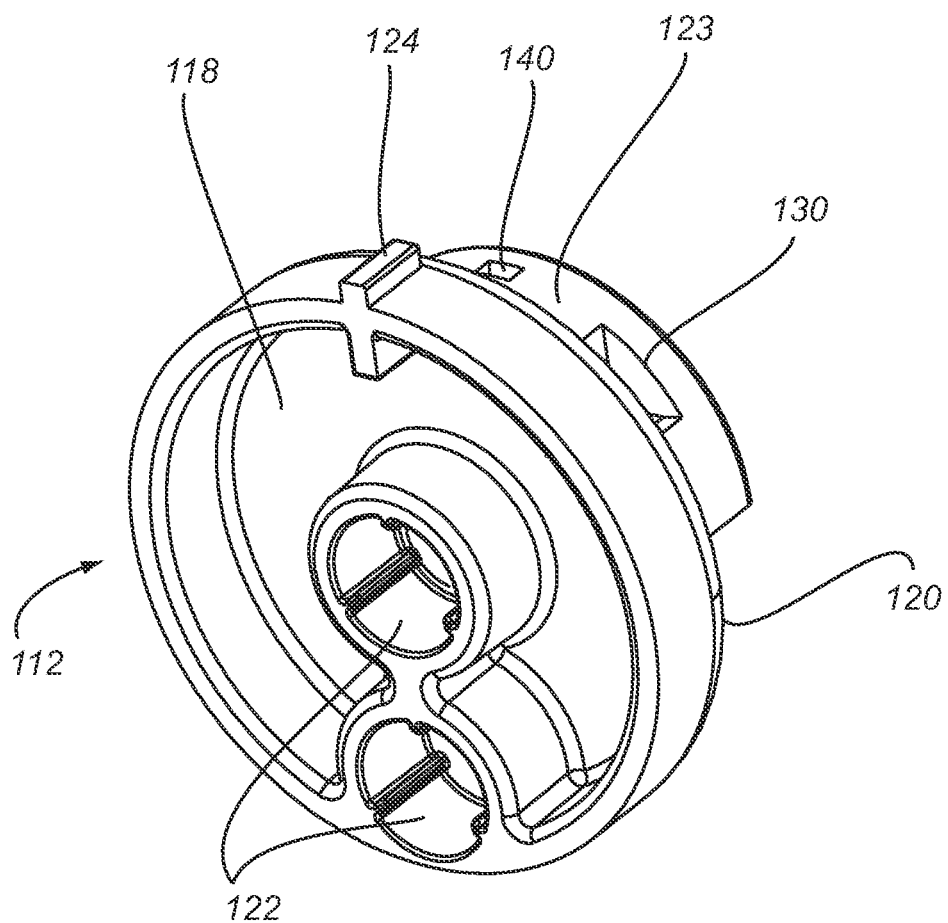
FIG. 29 is a side perspective view of the upper portion shown in FIG. 28.
Figure 30:
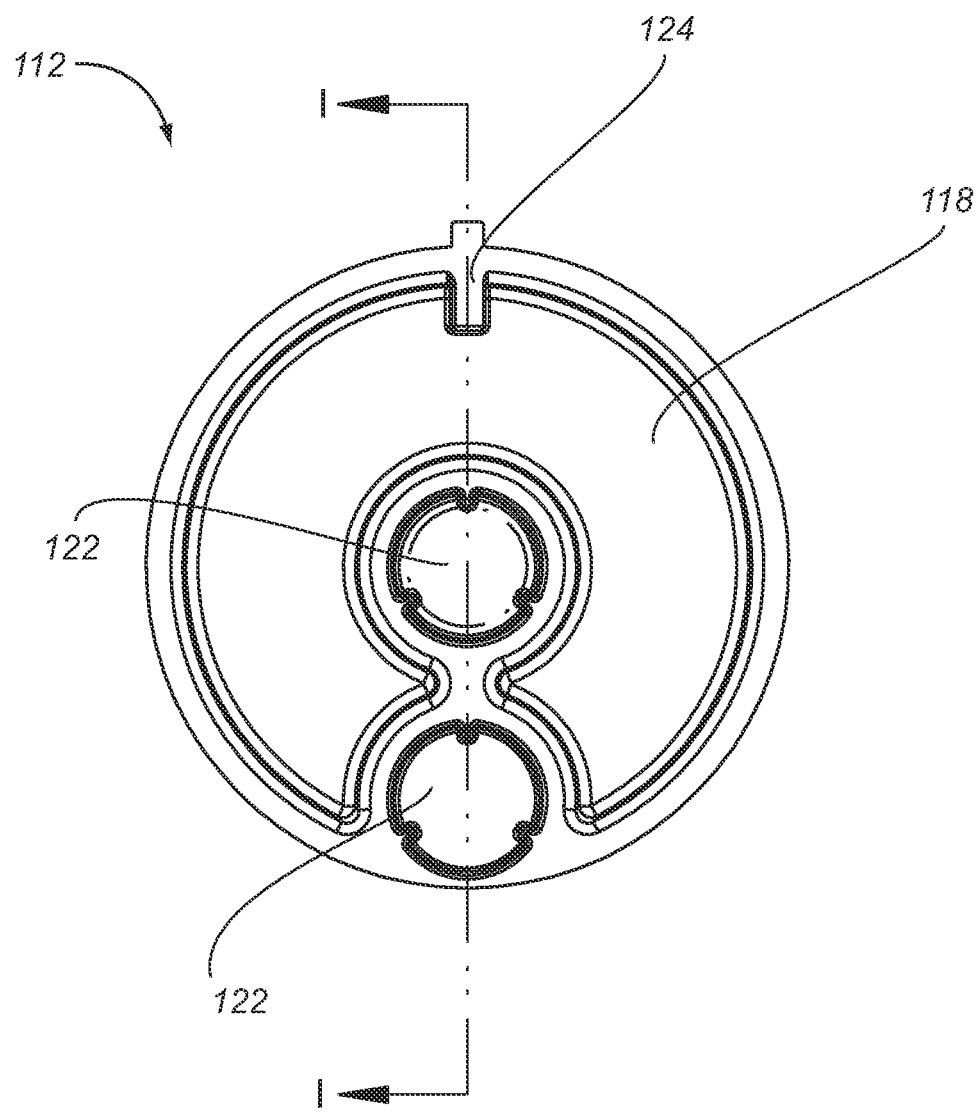
FIG. 30 is a front plan view of the upper portion shown in FIG. 28.
Figure 32:
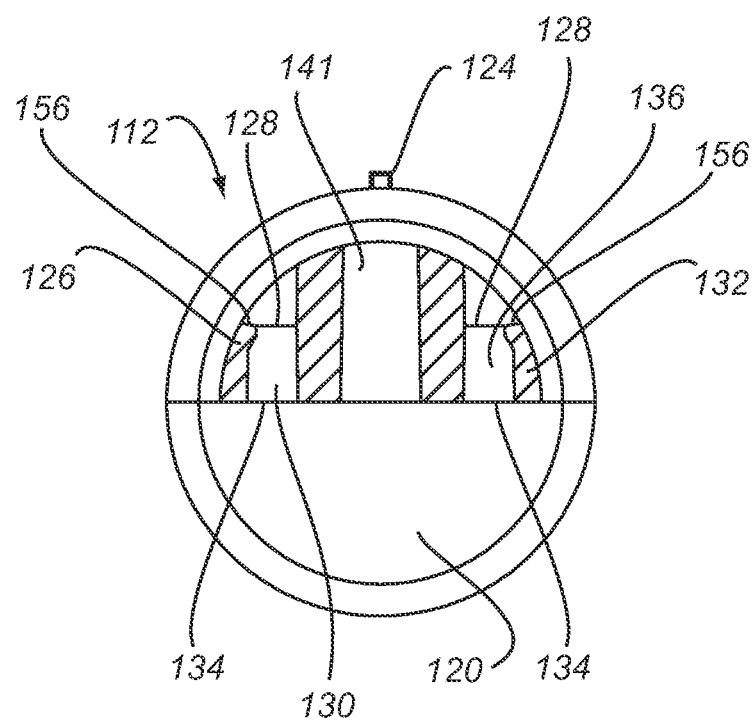
FIG. 32 is a cross-sectional view of the upper portion shown in FIG. 28, taken along line J-J of FIG. 31.
Figure 33:
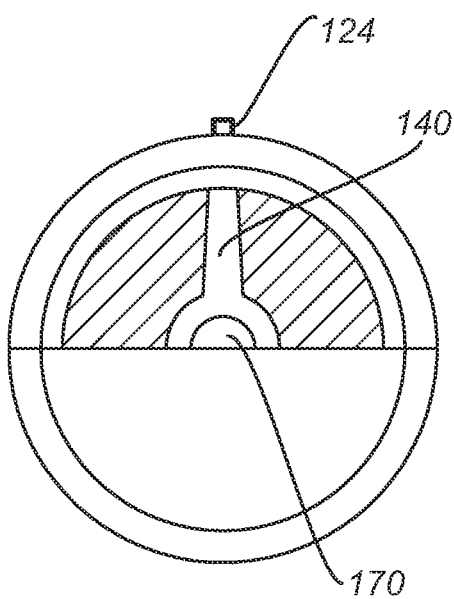
FIG. 33 is a cross-sectional view of the upper portion shown in FIG. 28, taken along line K-K of FIG. 31.
Figure 34:
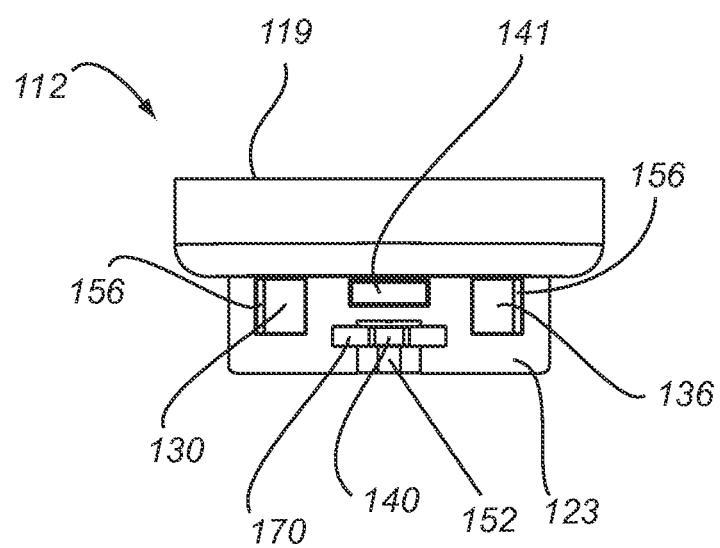
FIG. 34 is a bottom plan view of the upper portion shown in FIG. 28.
Figure 35:
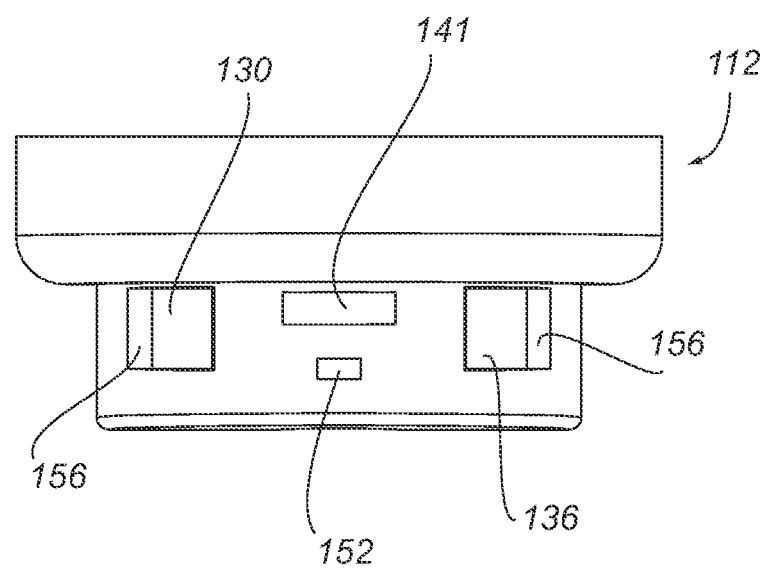
FIG. 35 is a top plan view of the upper portion shown in FIG. 28.
Figure 36:
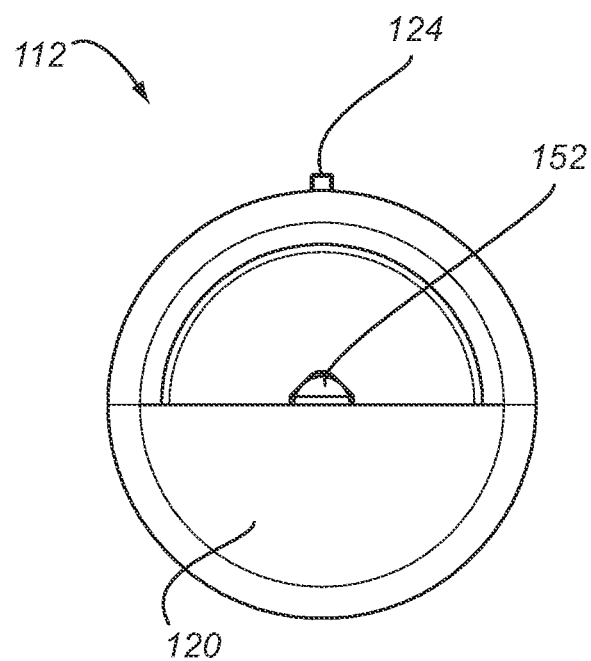
FIG. 36 is a back plan view of the upper portion shown in FIG. 28.

As shown in FIGS. 29 and 31, a base 123 extends from back surface 120 of upper portion 112. As shown in FIG. 34, base 123 includes a first gap 136, a second gap 130, and a third gap 141. Base 123 also includes an opening 170 and an aperture 140, as shown in FIGS. 32-34. Aperture 140 lies along the same axis 164 as opening 170, as shown in FIG. 31. Aperture 140 is shaped and sized to receive a tip 106 of a pointer 104 of the gas meter index 102 illustrated in FIGS. 44-48. Opening 170 is shaped and sized to receive the body 108 of pointer 104.

As shown in FIG. 32, at the cross-section taken at line J-J, left abutment 126 abuts first gap 130 along a portion of first gap 130. At this same cross-section, right abutment 132 abuts second gap 136 along a portion of first gap 136. This configuration reduces the size of the gaps 130 and 136, as illustrated in FIG. 32, at one end 128 of the gaps 130 and 136. Specifically, the gaps 130 and 136 are narrower in width at end 128 than at end 134. As shown in FIG. 32, left and right abutments 126, 132 each include a surface 156. Base 123 also includes a cavity 152, which, as explained in more detail below, is shaped and sized to receive stem 109 of pointer 104 (shown in FIG. 24).

Figure 37:
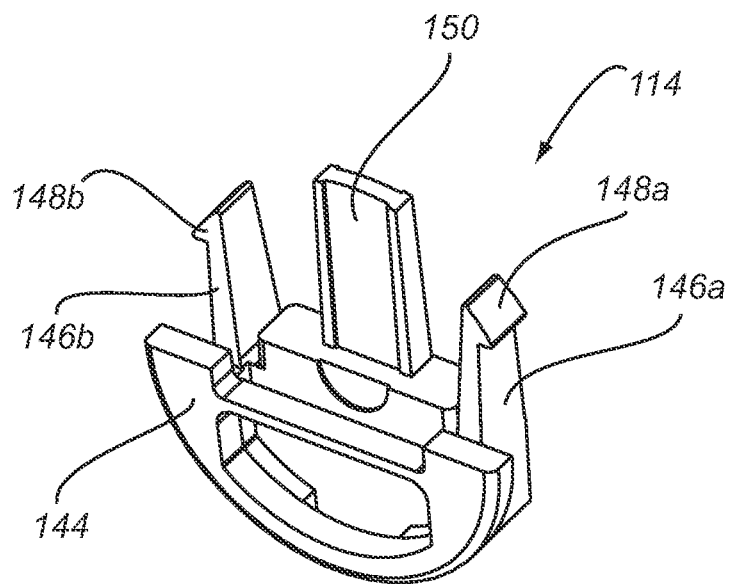
FIG. 37 is a top front perspective view of a clip of an adapter assembly according to another embodiment.
Figure 38:
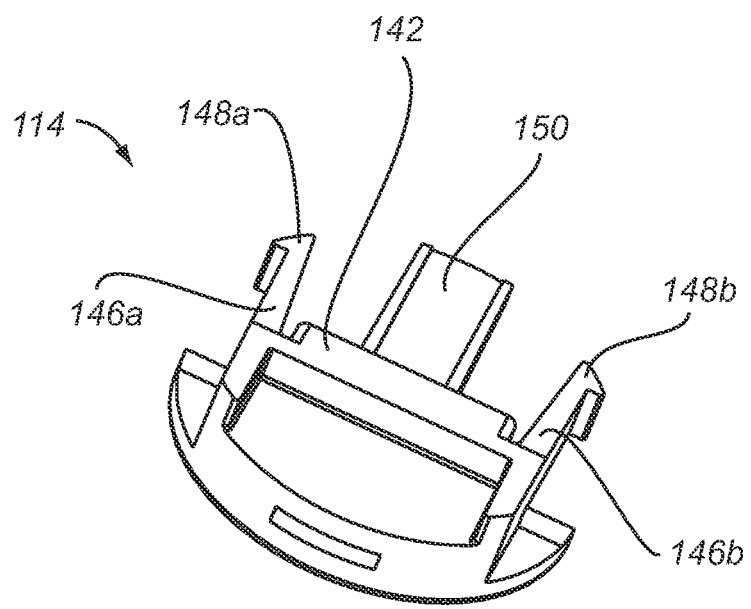
FIG. 38 is a front perspective view of the clip of FIG. 37.
Figure 39:
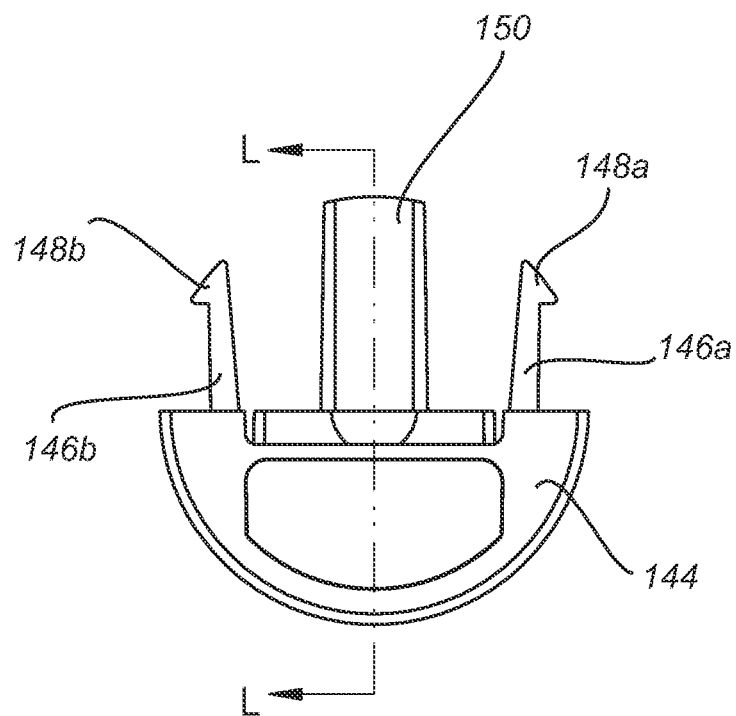
FIG. 39 is a front plan view of the clip of FIG. 37.
Figure 40:
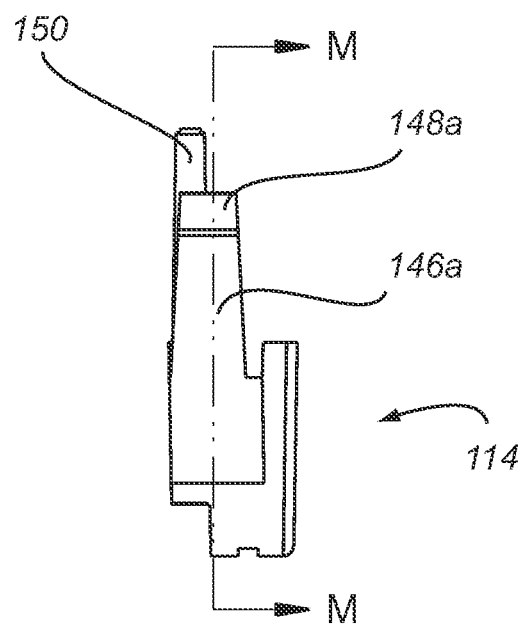
FIG. 40 is a side plan view of the clip of FIG. 37.
Figure 41:
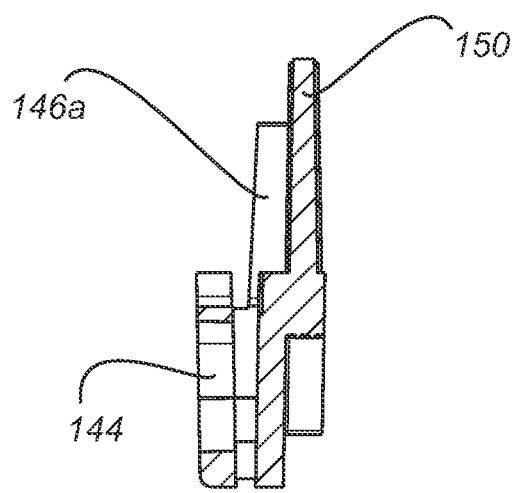
FIG. 41 is a cross-sectional view of the clip of FIG. 37, taken along line L-L of FIG. 39.
Figure 42:
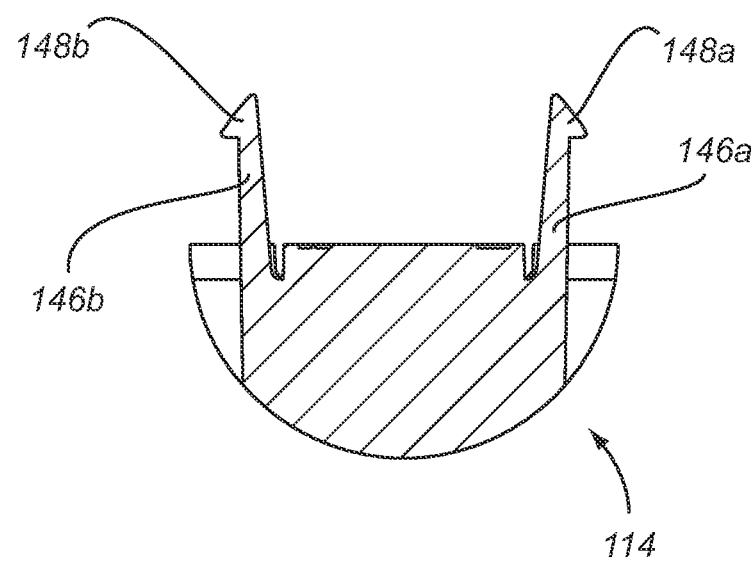
FIG. 42 is a cross-sectional view of the clip of FIG. 37, taken along line M-M of FIG. 40.
Figure 43:
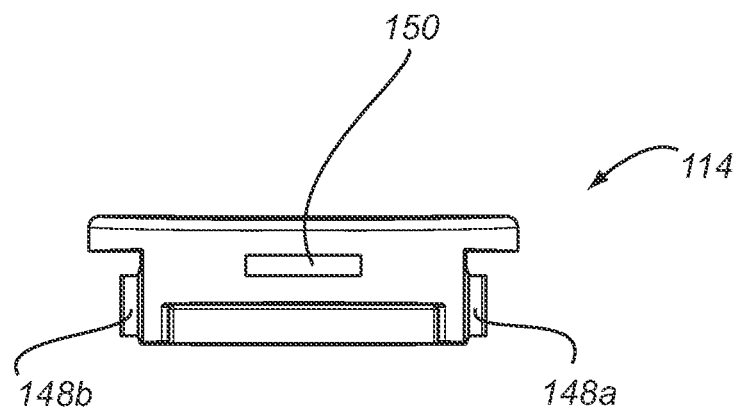
FIG. 43 is a bottom plan view of the clip of FIG. 37.
Figure 51:
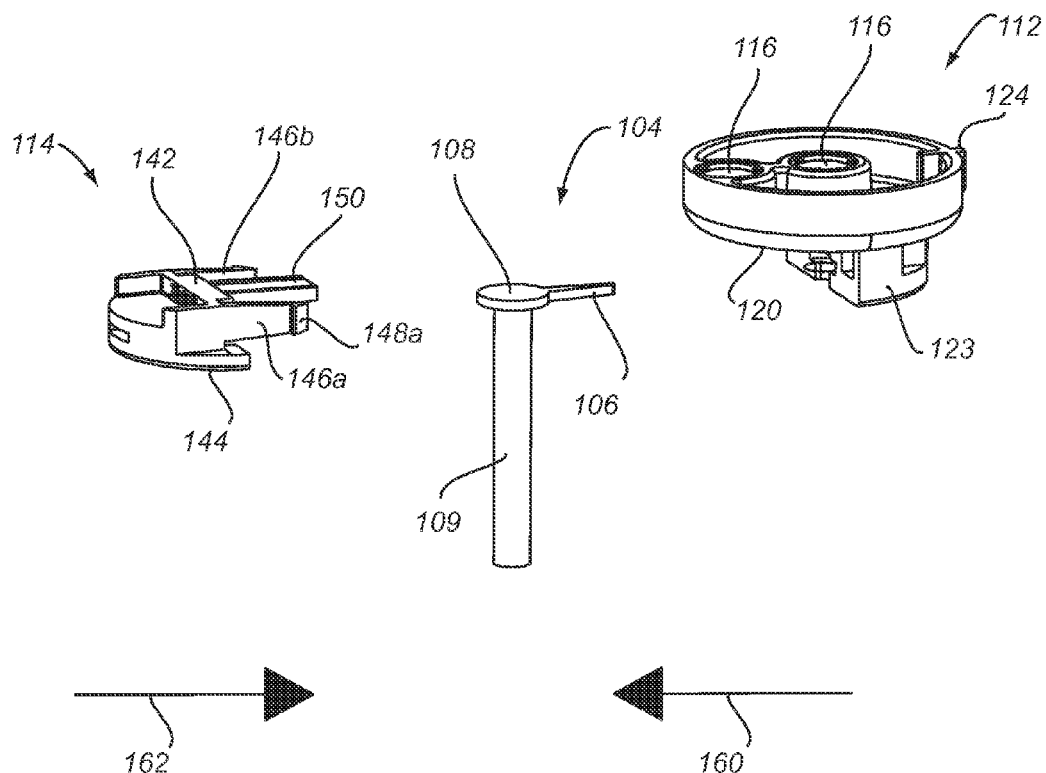
FIG. 51 is an exploded perspective view of the upper portion of FIG. 28 and the clip of FIG. 37 positioned with respect to a pointer of an index, such as the index illustrated in FIG. 45.
Figure 52:
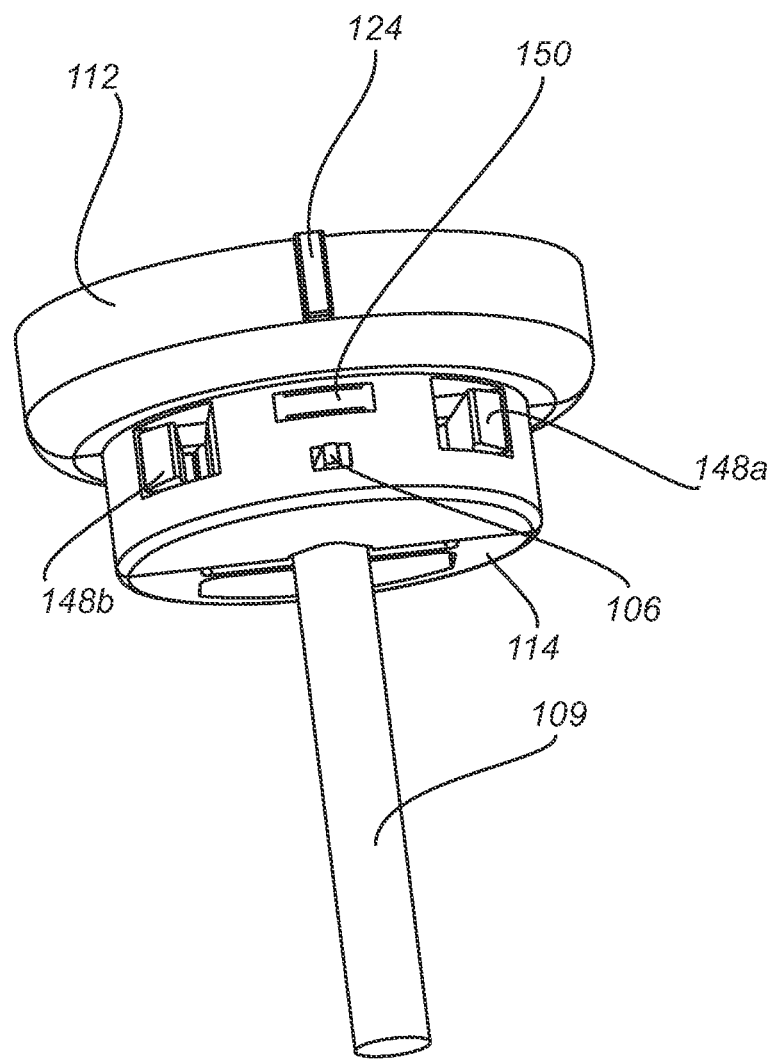
FIG. 52 is a back top perspective view of the adapter assembly of FIG. 45.
Figure 53:
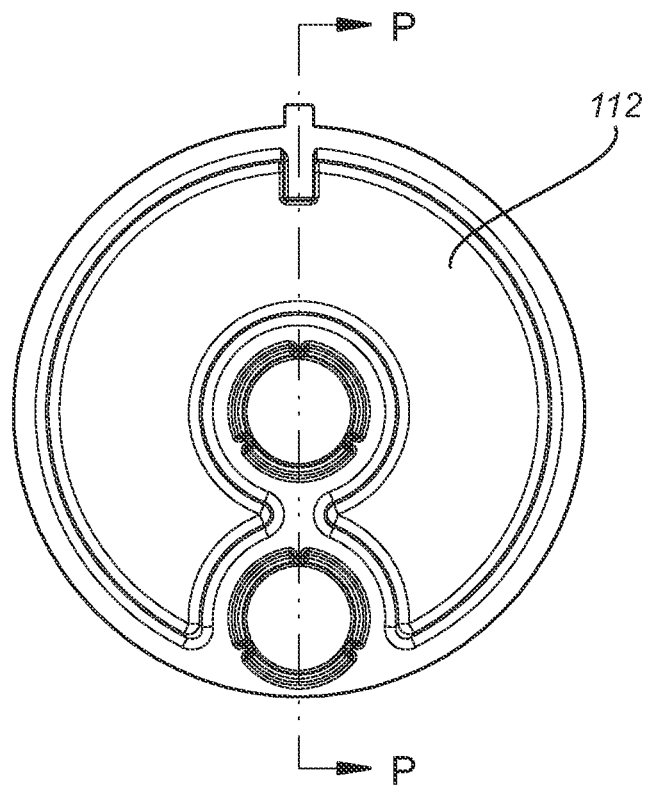
FIG. 53 is a front plan view of the adapter assembly of FIG. 45 fitted with a pointer of the index of FIG. 44.
Figure 54:
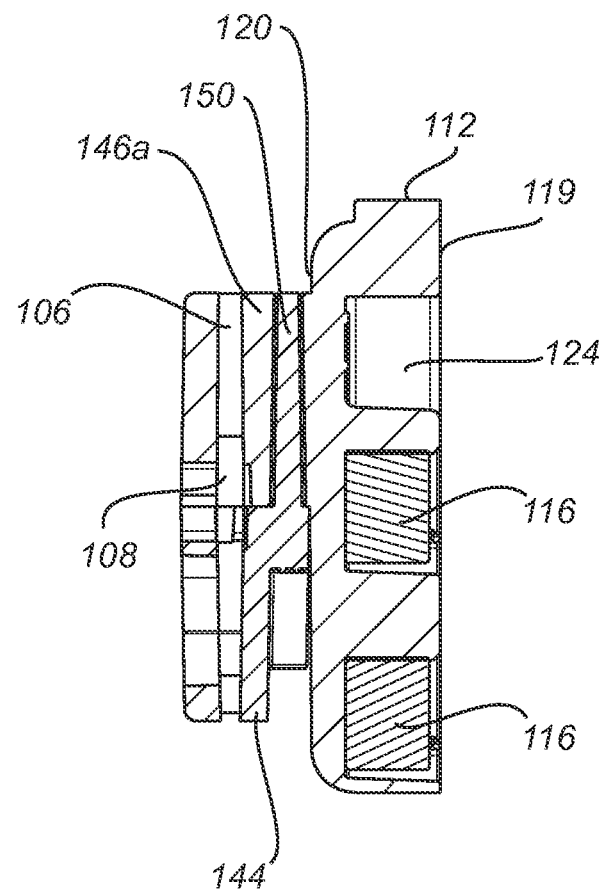
FIG. 54 is a cross-sectional view of the adapter assembly of FIG. 53, taken along line P-P of FIG. 53.

The upper portion 112 fits together with a clip 114 to form adapter assembly 110 for use with index 102. As shown in FIG. 51, for example, the back surface 120 of upper portion 112 is positioned with respect to the back 142 of clip 114 as the upper portion 112 and clip 114 fit together. FIGS. 37-44 show various views of clip 114. As shown in FIGS. 37-39, clip 14 includes two arms 146a, 146b, which extend from the clip 114 and which each include an extension 148a, 148b that extends laterally from the respective arm 146a, 146b. Turning to FIGS. 45-49, arms 146 of clip 114 are configured to be received within the first gap 130 and the second gap 136, respectively, of the base 123 of upper portion 112 when clip 114 mates with upper portion 112. Due to the configuration of the abutments 126, 132, there is little to no interference between the arms 146 of clip 114 and abutments 126, 132 as the arms first enter openings 130 and 136 at end 134.

As mentioned above, the configuration of abutments 126, 132 reduces the size of the openings 130 and 136 at each opening's respective end 128. In this way, end 128 of openings 130 and 136 is narrower in width than end 134 of openings 130 and 136. In the embodiment shown, the width of end 128 of openings 130, 136 is narrower than the width of extensions 148a, 148b so that abutments 126, 132 place stress on the extensions 148a, 148b of the clip 114 as they extend through end 128 of openings 130 and 136, such stress compressing the arms 146 of the clip 114 so that extensions 148a, 148b are capable of fitting through end 128. Once the extensions 148a, 148b are through the end 128 of openings 130, 136 (see FIG. 50), abutments 126, 132 no longer place stress on arms 146 and the arms 146 spring back out. Once the extensions 148a, 148b are through the end 128 of openings 130 and 136, extensions 148a, 148b abut surfaces 156 of left and right abutments 126, 132 to help keep arms 146a, 146b in place and to maintain a space between the upper portion 112 and the clip 114 to accommodate the stem 109 of pointer 104. There are numerous other ways of accomplishing the spring-fit feature of clip 114 with upper portion 112.

Figure 44:
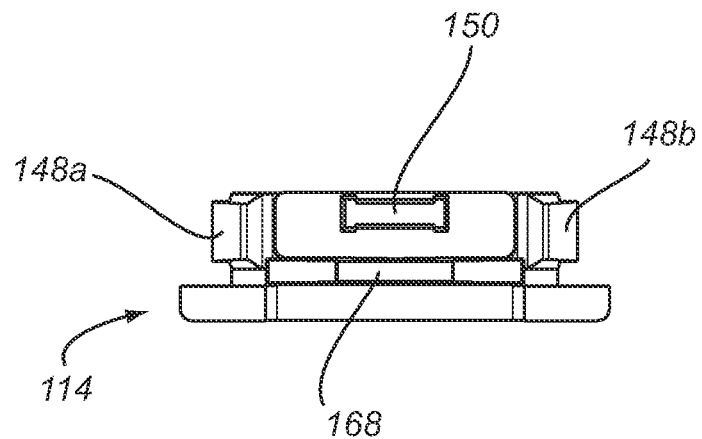
FIG. 44 is a top plan view of the clip of FIG. 37.

Clip 114 also includes a cavity 168 between a front surface 144 of the clip and the back 142 of clip 114 (FIG. 44). Cavity 168 is shaped and sized to accommodate the body 108 of pointer 104 of index 102 (FIG. 51), as explained below. The clip 114 also includes a tongue 150 that fits in third gap 141 when upper portion 112 and clip 114 are fitted together.

Figure 45:
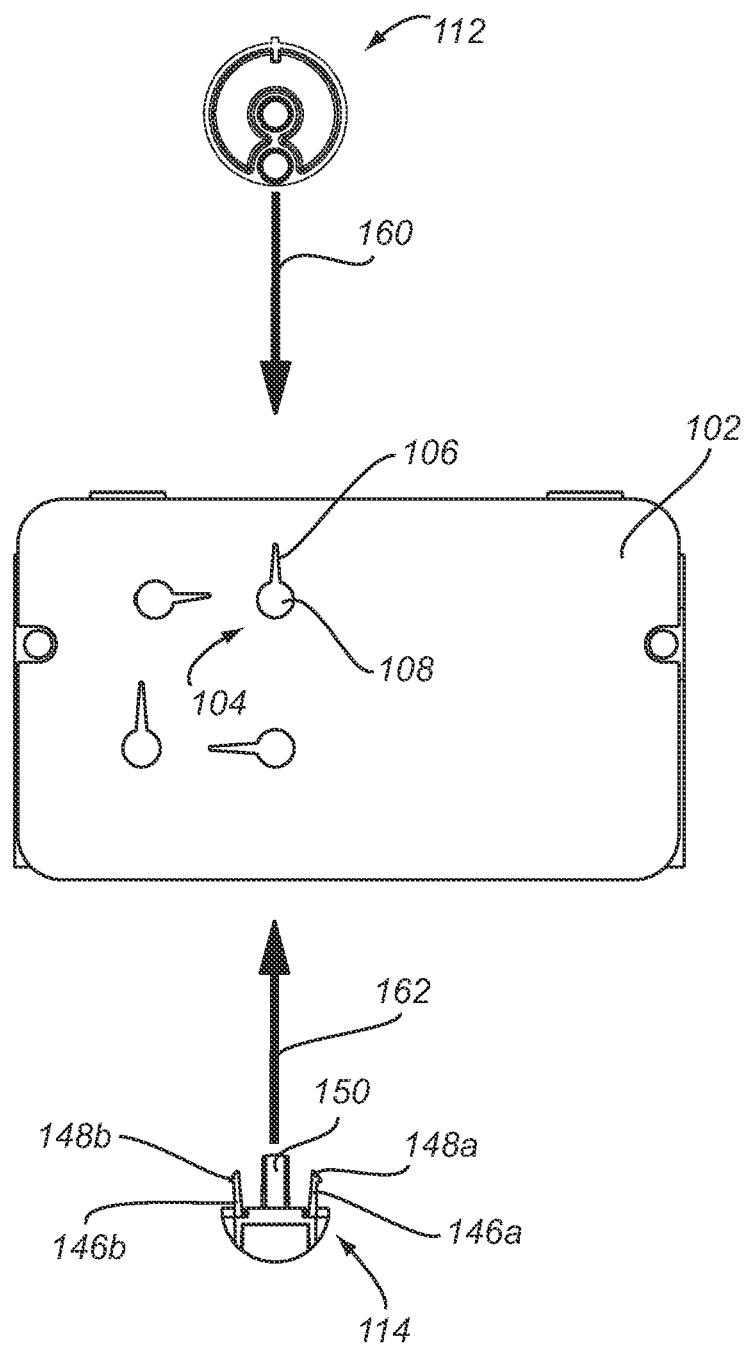
FIG. 45 is a front plan view of an index positioned with respect to the upper portion of FIG. 28 and the clip of FIG. 37, according to one embodiment.
Figure 49:
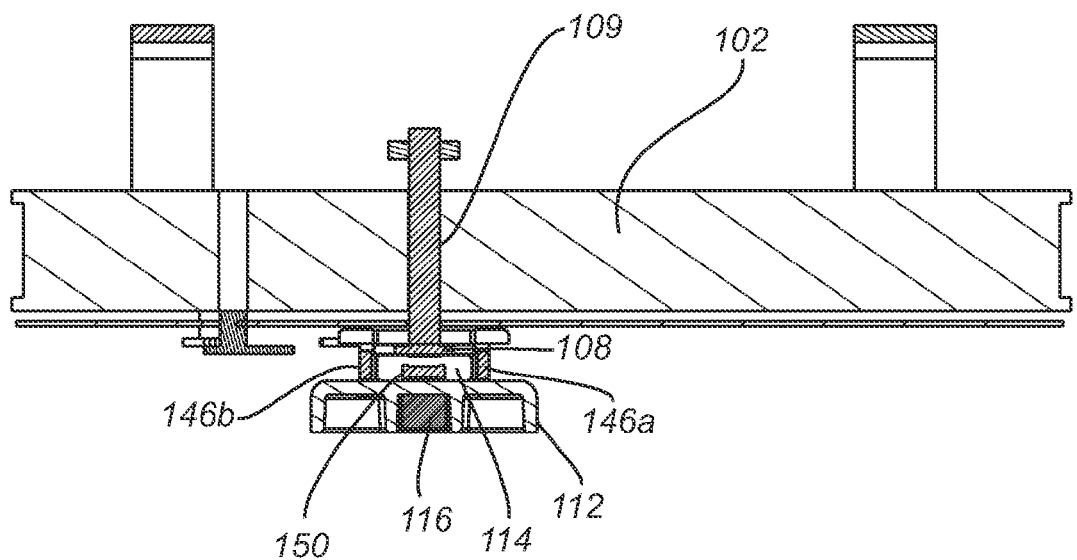
FIG. 49 is a cross-sectional view of the index of FIG. 45 fitted with the adapter assembly of FIG. 45, taken along line O-O of FIG. 47.
Figure 50:
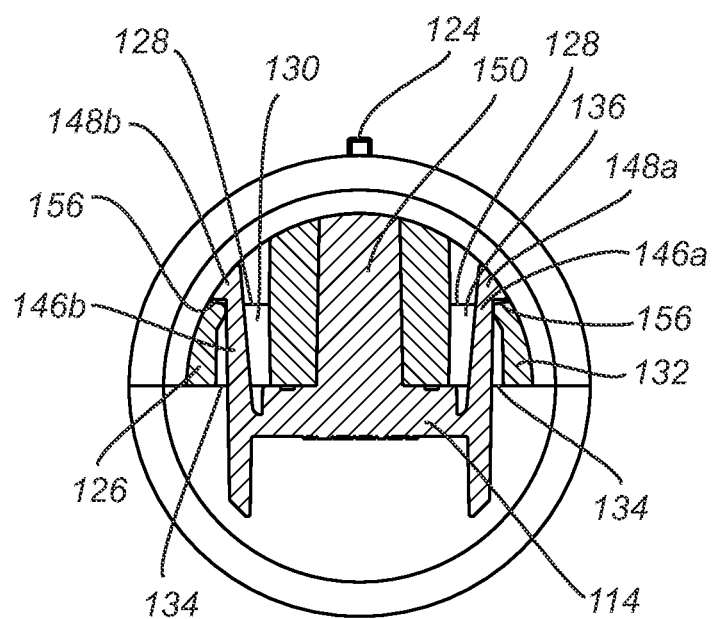
FIG. 50 is a cross-sectional view of the adapter assembly of FIG. 48, taken along line R-R of FIG. 48.

In use, as shown in FIGS. 45 and 49, upper portion 112 and clip 114 mate together to engage pointer 104 of index 102. Specifically, upper portion 112 is positioned with respect to index 102 from a first direction 160 so that the tip 106 of pointer 104 slides through the opening 170 and rests into aperture 140 of upper portion 112 and so that the body 108 of pointer 104 rests within opening 170. Aperture 140 is slightly larger than the tip 106 of pointer 104, while opening 170 is slightly larger than the body 108 of pointer 104, but sized so that both the tip 106 and the body 108 are received snuggly within aperture 140 and opening 170, respectively, to maintain the alignment of pointer 104 within the adapter assembly and prevent upper portion 112 and clip 114 from wobbling.

Figure 46:
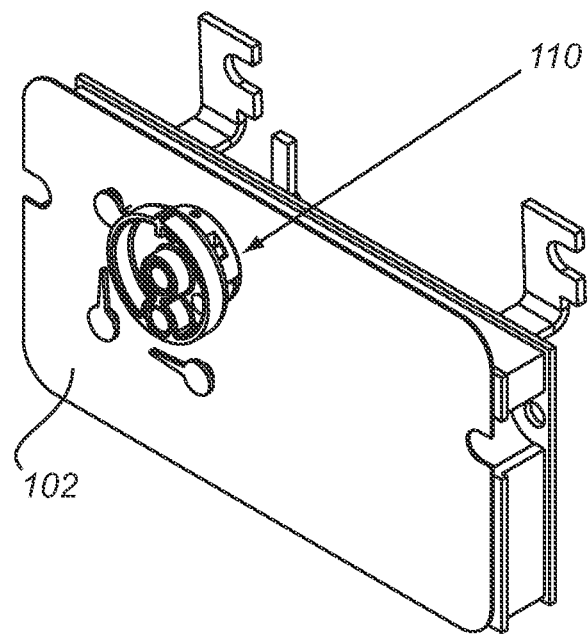
FIG. 46 is a front top perspective view of the index of FIG. 45 fitted with the adapter assembly of FIG. 45.
Figure 47:
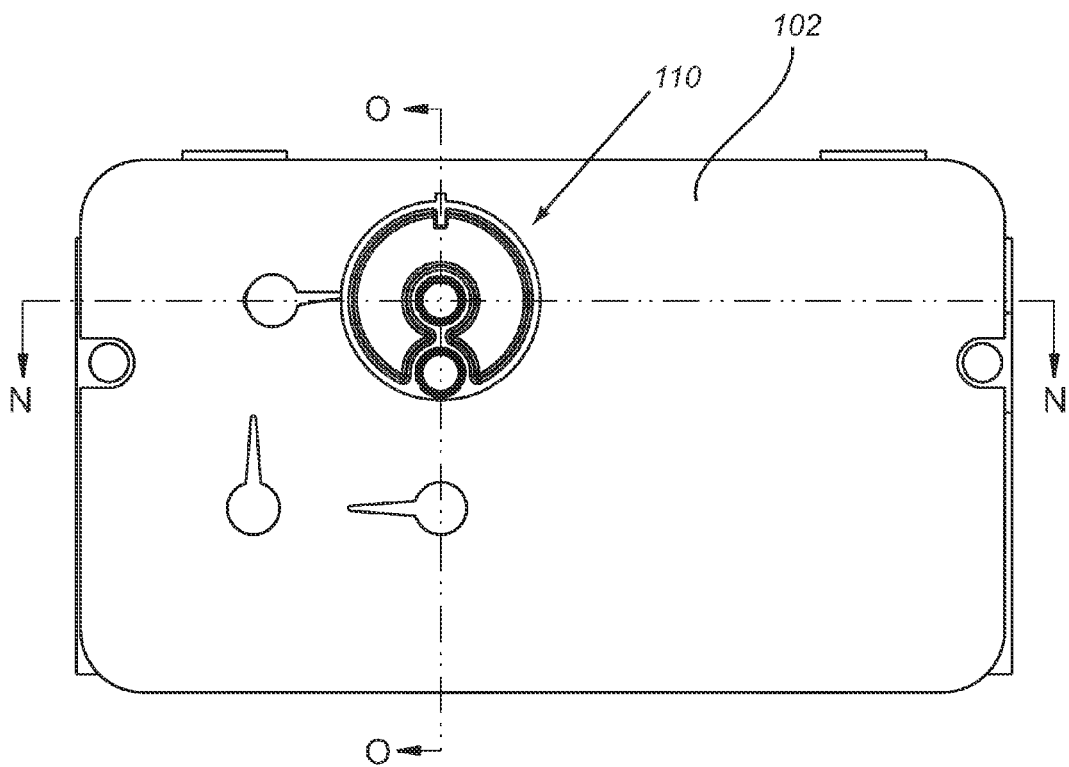
FIG. 47 is a front plan view of the index of FIG. 45 fitted with the adapter assembly of FIG. 45.
Figure 48:
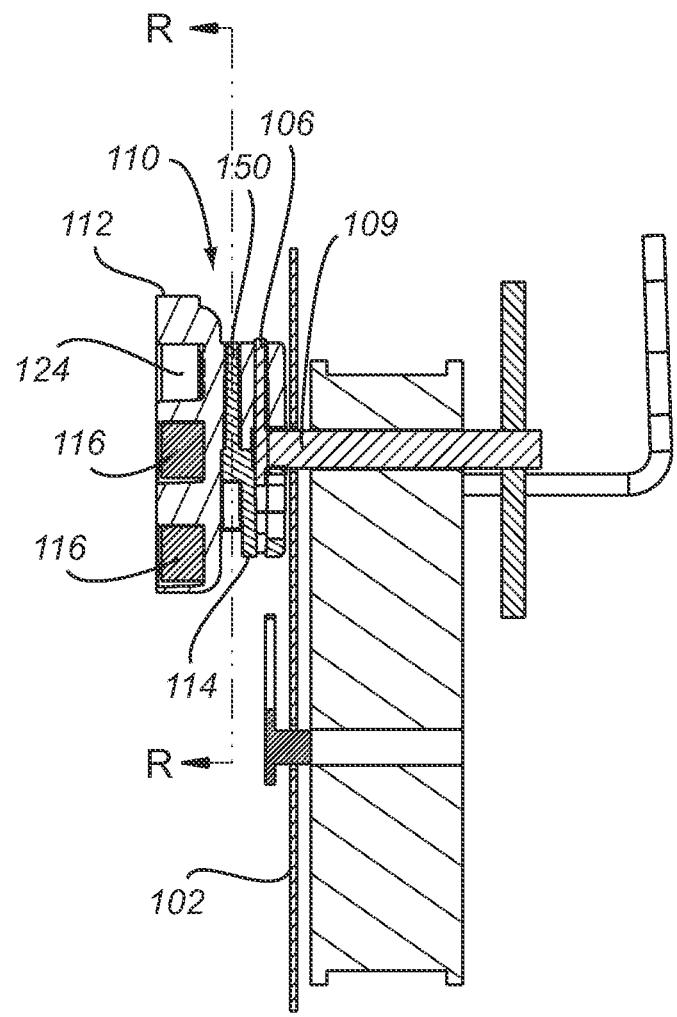
FIG. 48 is a cross-sectional view of the index of FIG. 45 fitted with the adapter assembly of FIG. 45, taken along line N-N of FIG. 47.

Next, clip 114 is positioned with respect to index 102 from a second direction 162, which is opposite first direction 160, so that clip 114 cooperates with pointer 104 and is mated onto upper portion 112 (FIGS. 45 and 46). Specifically, body 108 of pointer 104 abuts the cavity 168 of clip 114 when the clip is mated to the upper portion. Tongue 150 of clip 114 is received in third gap 141 of upper portion 112. Tongue 150 acts as a guiding pin and helps reduce any rocking of upper portion 112 and clip 114 when fitted together around pointer 104. As mentioned above, the positioning of arms 148a, 148b within gaps 130 and 136 is limited by abutments 126, 132 so that a gap is formed between upper portion 112 and clip 114 when the two components fit together. A stem 109 of pointer 104 (FIG. 51) is accommodated in this gap between the clip 114 and upper portion 112 when the two components are fitted together (FIG. 48). Clip 114 can be snap fit onto upper portion 112 to lock the upper portion 112 with respect to the pointer 104, or secured to upper portion 112 in any other suitable manner.

The rotation of the internal gears of the gas meter cause the pointer 104 to rotate, which can be used to track consumption as described above. Because the adapter assembly 110 is securely coupled to the pointer 104, the rotation of the pointer 104 causes the adapter assembly 110, and thus the magnets 116, to also rotate in a concentric motion. In some embodiments, one of the magnets 116 aligns with the axis of rotation of the pointer 104. The rotation of the magnet furthest from the center of upper portion 112 generates magnetic pulses that can be used to determine that the adapter assembly 110 is present on the index 102 and/or can be used to track the number of rotations of the pointer of the gas meter, and thus the consumption of gas as known to those of skill in the art. The magnet closer to the center of upper portion 112 can be used as a tamper detection feature so that it generates a signal if someone attempts to tamper with the adapter assembly 110. For example, if upper portion 112 and clip 114 are removed from pointer 104, the magnet closer to the center of upper portion 112 moves from its initial position and thus generates a signal corresponding to such movement. In some embodiments, a sensor board and radio assembly (not shown) are mounted adjacent the adapter assembly 110 and receive the pulses generated by the magnets, convert them into electronic form, and transmit them to a remote location. In some embodiments, the sensor board is located approximately 0.1-0.3 inches or any other suitable distance from the adapter assembly.

In some embodiments, upper portion 112 includes an indicator tab 124 positioned on front surface 118, which is radially aligned with opening 140 so that indicator tab 124 serves as an indicator for the orientation of pointer 104. Thus, even though pointer 104 is hidden from view by adapter assembly 110, indicator tab 124 allows the positioning/orientation of pointer 104 on index 102 to be determined. In addition to or as an alternative to indicator tab, upper portion 112 could include a notch, marking, or other suitable indicator. As shown in FIGS. 45-49, adapter assembly 110 is small enough that the majority of index 102 is still visible when adapter assembly 110 engages pointer 104.

The configuration of upper portion 112 and clip 114 allows the two components to fit together around pointer 104 in a manner that allows the adapter assembly 110 to track to the pointer 104 without impacting the rotation of the pointer. Because adapter assembly 110 includes clip 114, clip 114 having a front surface 144 that is spaced apart from the back 142 of the clip, the back surface 120 of the upper portion 112 of adapter assembly does not contact the index in use. This reduces stress or friction on the index, which could shorten the life span of the index, as adapter assembly 110 rotates with pointer 104. Moreover, this configuration allows pointer 104 to rotate without obstruction.

In some embodiments, upper portion 112 and/or clip 114 are formed of polycarbonate, which is lightweight compared to the magnets 116, which are made of neodymium and iron in some embodiments. The lightweight nature of the adapter assembly 110 allows it to rotate freely with the pointer 104 and without exerting undue pressure on the pointer 104 (and in turn on the index). In other embodiments, adapter assembly 110 is made of other suitable materials.

Numerous modifications of this invention may be made in the composition, application, manufacturing process and other aspects of this invention without departing from the objectives and spirit of the description above and in the Figures.

The invention claimed is:

1. An adapter assembly for use with a utility meter having a pointer rotationally coupled to an index, the adapter assembly comprising:
   (a) a magnet receiving portion comprising:
      (i) a front surface and at least one cavity located on the front surface for receiving a magnet; and
      (ii) a generally hemispherical base portion extending from a back surface of the magnet receiving portion, the base portion comprising a first gap, a second gap, and an opening configured to receive the pointer, the opening positioned generally between the first gap and the second gap;
   (b) a clip comprising:
      (i) a front surface;
      (ii) a back surface;
      (iii) two arms that are shaped and sized to be received within the first gap and the second gap of the magnet receiving portion; and
      (iv) a cavity formed between the front surface of the clip and the back surface of the clip that is configured to receive a base of the pointer.

2. The adapter assembly of claim 1, further comprising at least one magnet that is received within the at least one cavity of the magnet receiving portion for sending magnetic pulses as the pointer rotates.

3. The adapter assembly of claim 1, wherein the at least one cavity of the magnet receiving portion comprises a first cavity located approximate to a center of the front surface of the magnet receiving portion and a second cavity located adjacent the first cavity approximate an edge of the front surface of the magnet receiving portion.

4. The adapter assembly of claim 1, wherein the magnet receiving portion further comprises an indicator that is aligned with an axis of the opening for indicating the position of the pointer.

5. The adapter assembly of claim 1, wherein the magnet receiving portion further comprises an aperture configured to receive a tip of the pointer, the tip being smaller than the opening and the aperture.

6. The adapter assembly of claim 1, further comprising a tongue that extends from the clip and that is shaped and sized to be received within a third gap of the magnet receiving portion, the third gap being positioned between the first gap and the second gap.

7. The adapter assembly of claim 1, wherein the front surface of the clip is positioned with respect to the index when the adapter assembly is rotationally coupled to the index and the presence of the clip prevents the back surface of the magnet receiving portion from contacting the index.

8. The adapter assembly of claim 1, wherein the magnet receiving portion is circular.

9. The adapter assembly of claim 1, further comprising a left abutment adjacent to the first gap and a right abutment adjacent to the second gap.

10. The adapter assembly of claim 9, wherein the two arms of the clip each comprise an extension that abuts a surface of the two abutments.

11. The adapter assembly of claim 10, wherein the interaction between the extensions of the arms and the surfaces of the abutments limits how far the two arms can be received within the first and second gaps.

12. The adapter assembly of claim 11, wherein a space is formed between the clip and the magnet receiving portion when the two are fitted together, the space configured to accommodate a stem of the pointer.

13. The adapter assembly of claim 1, wherein the opening of the magnet receiving portion is configured to receive a body of the pointer.

14. A method for adapting a utility meter having an index with a rotatable pointer comprising:
   providing a magnet receiving portion comprising a back surface, a front surface, at least one cavity located on the front surface, a first gap, a second gap, and an opening;
   providing a clip comprising a front surface, a back surface, a cavity formed between the front surface of the clip and the back surface of the clip, and two arms;
   aligning the magnet receiving portion with the pointer;
   inserting the pointer through the opening of the magnet receiving portion;
   aligning the clip with the pointer and with the magnet receiving portion so that a body of the pointer is positioned with respect to the cavity of the clip and so that a first of the arms is received within the first gap and a second of the arms is received within the second gap; and
   securing the clip to the magnet receiving portion.

15. The method of claim 14, further comprising inserting a magnet into the cavity of the front surface of the magnet receiving portion.

16. The method of claim 14, wherein the clip is aligned with the magnet receiving portion so that the back surface of the magnet receiving portion does not contact the index.

17. The method of claim 14, wherein the step of proving an upper a magnet receiving portion with at least one cavity comprises providing an upper a magnet receiving portion with a first cavity and a second cavity, and
   the method further comprising the step of inserting a second magnet into the second cavity for determining if the magnet receiving portion has been tampered with.

18. The method of claim 14, wherein the step of inserting the pointer through the opening of the magnet receiving portion further comprises inserting a tip of the pointer into an aperture of the magnet receiving portion.

19. An adapter assembly for use with a utility meter having a pointer rotationally coupled to an index, the adapter assembly comprising:
   a clip that is configured to interface with at least a portion of the pointer;
   a magnet receiving portion that mates with the clip and that is configured to interface with at least a portion of the pointer so that the magnet receiving portion rotates when the pointer rotates, the magnet receiving portion further comprising at least one cavity;
   and
   wherein the at least one cavity is aligned with an axis of rotation of the pointer when the magnet receiving portion interfaces with the pointer.

20. An adapter assembly for use with a utility meter having a pointer rotationally coupled to an index, the adapter assembly comprising:
   (a) a pointer tip receiving portion comprising:
      (i) a magnet receiving surface having at least one cavity located on the magnet receiving surface for receiving a magnet; and (ii) a generally hemispherical base portion extending from a surface opposite the magnet receiving surface, the base portion comprising a first gap, a second gap, and an opening configured to receive the tip of the pointer, the opening positioned generally between the first gap and the second gap;

(b) a clip comprising:
  (i) a first surface;
  (ii) a second surface opposite the first surface;
  (iii) two arms that are shaped and sized to be received within the first gap and the second gap of the pointer tip receiving portion; and
  (iv) a cavity formed between the first surface of the clip and the second surface of the clip that is configured to receive a base of the pointer.

* * * * *